US008558873B2

(12) United States Patent
McEldowney

(10) Patent No.: US 8,558,873 B2
(45) Date of Patent: Oct. 15, 2013

(54) USE OF WAVEFRONT CODING TO CREATE A DEPTH IMAGE

(75) Inventor: Scott McEldowney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 12/816,985

(22) Filed: Jun. 16, 2010

(65) Prior Publication Data

US 2011/0310226 A1    Dec. 22, 2011

(51) Int. Cl.
*H04N 15/00* (2006.01)
*H04N 13/02* (2006.01)

(52) U.S. Cl.
USPC ............................. 348/46; 382/103; 382/128

(58) Field of Classification Search
USPC .................................... 348/46; 382/103, 128
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Greengard, "Depth from Diffracted Rotation", Optical Society of America, Optics Letters, Jan. 15, 2006, pp. 181-183, vol. 31, No. 2, Department of Electrical and Computer Engineering, University of Colorado at Boulder, Boulder, CO, USA.

Pavani, "Three Dimensional Tracking of Fluorescent Microparticles Using a Photon-Limited Double-Helix Response System", Optical Society of America, Optics Express, Dec. 22, 2008, pp. 22048-22057, vol. 16, No. 26, Department of Electrical and Computer Engineering, University of Colorado, Boulder, CO, USA.

(Continued)

*Primary Examiner* — Anner Holder
(74) *Attorney, Agent, or Firm* — Vierra Magen Marcus LLP

(57) ABSTRACT

A 3-D depth camera system, such as in a motion capture system, tracks an object such as a human in a field of view using an illuminator, where the field of view is illuminated using multiple diffracted beams. An image sensing component obtains an image of the object using a phase mask according to a double-helix point spread function, and determines a depth of each portion of the image based on a relative rotation of dots of light of the double-helix point spread function. In another aspect, dual image sensors are used to obtain a reference image and a phase-encoded image. A relative rotation of features in the images can be correlated with a depth. Depth information can be obtained using an optical transfer function of a point spread function of the reference image.

20 Claims, 21 Drawing Sheets

(56) References Cited

U.S. PATENT DOCUMENTS

| | | |
|---|---|---|
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,525,302 B2 | 2/2003 | Dowski, Jr. et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,218,448 B1 | 5/2007 | Cathey, Jr. et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,349,104 B2 * | 3/2008 | Geng ............................ 356/603 |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,554,731 B2 | 6/2009 | Dowski, Jr. |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 * | 12/2009 | Marks et al. ................. 382/103 |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,787,132 B2 * | 8/2010 | Korner et al. ................. 356/601 |
| 7,809,167 B2 | 10/2010 | Bell |

(56) References Cited

U.S. PATENT DOCUMENTS

| | | | |
|---|---|---|---|
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2006/0238613 | A1 | 10/2006 | Takayama et al. |
| 2008/0026838 | A1 | 1/2008 | Dunstan et al. |
| 2008/0212838 | A1 | 9/2008 | Frigerio |
| 2009/0231278 | A1* | 9/2009 | St. Hilaire et al. ............ 345/158 |
| 2010/0002950 | A1 | 1/2010 | Arieli et al. |
| 2010/0008597 | A1 | 1/2010 | Findlay et al. |
| 2010/0278400 | A1* | 11/2010 | Piestun et al. ................ 382/128 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2006102201 A1 | 9/2006 |

OTHER PUBLICATIONS

Pavani, "High-Efficiency Rotating Point Spread Functions", Optical Society of America, Optics Express, Mar. 3, 2008, pp. 3484-3489, vol. 16, No. 5, Department of Electrical and Computer Engineering, University of Colorado, Boulder, CO, USA.

Piestun, "Propagation-Invariant Wave Fields with Finite Energy", Journal of the Optical Society of America, Feb. 2000, pp. 294-303, vol. 17, No. 2, Stanford University, Stanford, CA, USA.

Ziegler, "A Framework for Holographic Scene Representation and Image Synthesis", International Conference on Computer Graphics and Interactive Techniques, Institute of Computational Science, ETH CS Technical Report #522, Mar. 12, 2006, pp. 1-12, ACM, New York, NY, USA.

Dowski, "Extended Depth of Field Through Wave-Front Coding", Optical Society of America, Applied Optics, Apr. 10, 1995, pp. 1859-1866, vol. 34, No. 11, Imaging Systems Laboratory, Department of Electrical Engineering, University of Colorado, Boulder, CO, USA.

Dowski, "Wavefront Coding: A Modern Method of Achieving High Performance and/or Low Cost Imaging Systems", Proceedings of SPIE, Oct. 1999, pp. 137-145, vol. 3779, website, SPIE.

Dowski, "Wavefront Coding for Detection and Estimation with a Single-Lens Incoherent Optical System", Proceedings of the International Conference on Acoustics, Speech, and Signal Processing, May 1995, pp. 2451-2454,vol. 4, Detroit, MI, USA Toyama, Kentaro, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Pavani, Sri Rama Prasanna, et al., "Three-dimensional, single-molecule fluorescence imaging beyond the diffraction limit by using a double-helix point spread function," PNAS, Mar. 3, 2009, vol. 106, No. 9, 5 pages.

Chinese Office Action dated Feb. 5, 2013, Chinese Patent Application No. 2011101727880.

Response to Office Action dated May 30, 2013, Chinese Patent Application No. 201110172788.0.

* cited by examiner

Double-helix beam at z=0

Double-helix beam at $z=z_0/2$

Double helix PSF at focus

Double helix PSF at defocus

Exit pupil amplitude

Exit pupil phase ed States Patent

USE OF WAVEFRONT CODING TO CREATE A DEPTH IMAGE

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a three-dimensional (3-D) human skeletal model and used to create an animated character or avatar. Motion capture systems can include optical systems, including those using visible and invisible, e.g., infrared, light, which use cameras to detect the presence of a human or other object in a field of view. However, current systems are subject to limitations in terms of minimum object size and field of view.

SUMMARY

A processor-implemented method, motion capture system and tangible computer readable storage are provided for detecting motion in a 3-D depth camera in a motion capture system. Such depth cameras are used, for example, to detect movement of a user in a field of view and to translate the movements into control inputs to an application in the motion capture system. For example, the user may make hand gestures to navigate a menu, interact in a browsing or shopping experience, choose a game to play, or access communication features such as sending a message to a friend. Or, the user may use the hands, legs or the entire body to control the movement of an avatar in a 3-D virtual world.

In one embodiment, a 3-D depth camera system includes an illuminator and an imaging sensor. The illuminator creates at least one collimated light beam, and a diffractive optical element receives the light beam, and creates diffracted light beams which illuminate a field of view including a human target. The image sensor provides a detected image of the human target using light from the field of view but also includes a phase element which adjusts the image so that the point spread function of each diffractive beam which illuminated the target will be imaged as a double helix. At least one processor is provided which determines depth information of the human target based on the rotation of the double helix of each diffractive order of the detected image, and in response to the depth information, distinguishes motion of the human target in the field of view.

In another embodiment, a 3-D depth camera system for imaging an object in a field of view includes a first sensor which provides a reference image of the object, and a second sensor which provides a coded image of the object using a phase mask, where the phase mask encodes light from the object according to a double helix point spread function. The system further includes at least one processor which determines depth information of the object based on at least an intensity distribution of the reference image ($i_{ref}$) and an intensity distribution of the coded image ($i_{dh}$). For example, the at least one processor can determine the depth information according to: $F^{-1}\{F(i_{dh}) \times H_{ref}/F(i_{ref})\}$, where F denotes a Fourier transform, $F^{-1}$ denotes an inverse Fourier transform, and ($H_{ref}$) denotes an optical transfer function of a point spread function of the reference image.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

DETAILED DESCRIPTION

Currently, there are two primary methods to create a depth image. One method, which uses structured light, illuminates with a pattern and then measures the geometric distortion of the pattern and determines depth from the distortion. The second method, which uses time-of-flight, sends a modulated signal and then measures the phase change of the modulated signal. Both methods require an illumination system and have limitations in terms of minimum object size and field of view. We propose to measure properties of the wavefront returning from the scene in which depth image is desired. This is done by encoding the wavefront through a phase element in a known way and then deconvolving depth information by knowing the image intensity and the phase information. Thus, a phase element is used to encode wavefront information to measure a depth image. The phase element can be provided in an image sensor.

Figure 1:
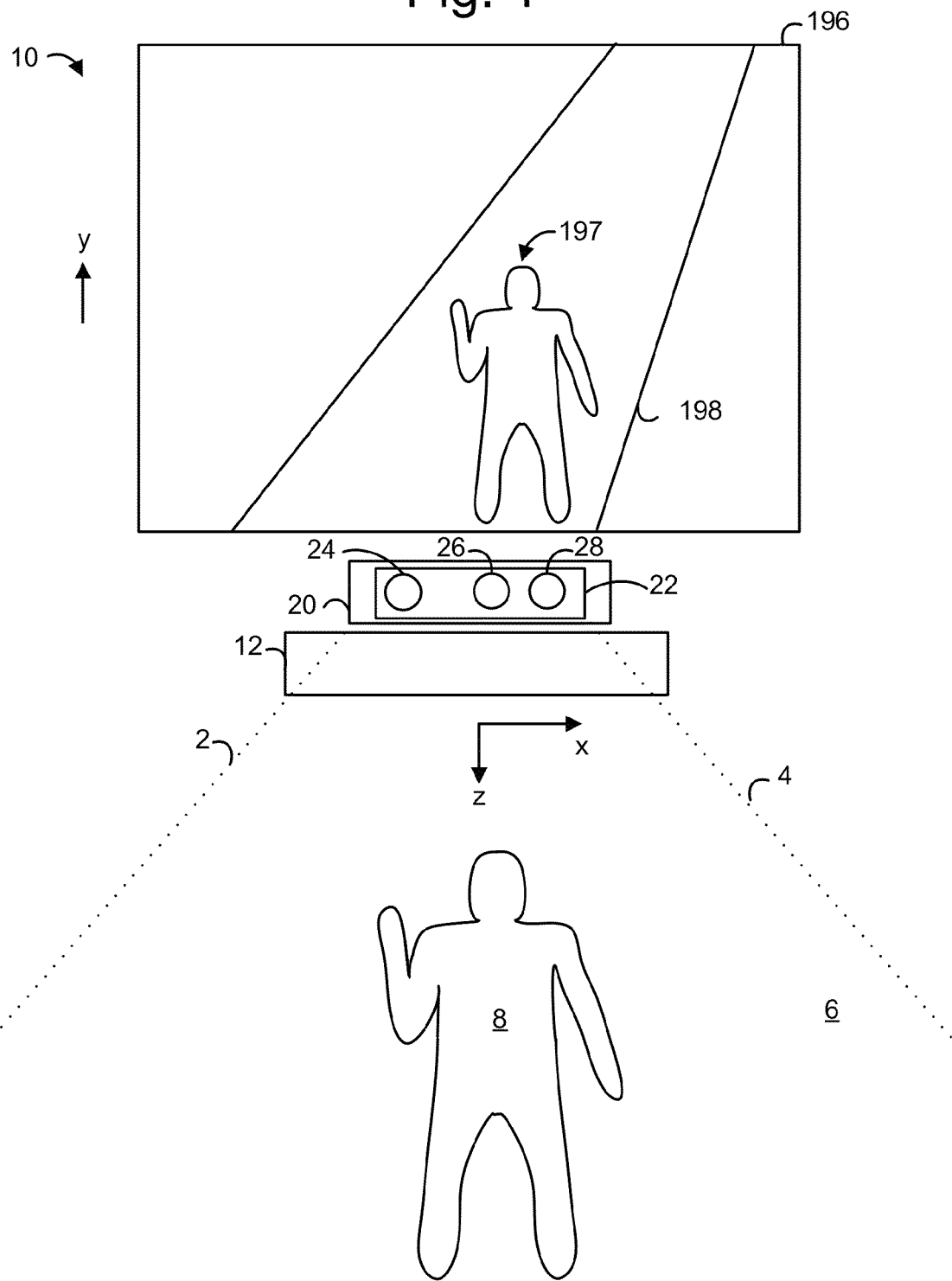
FIG. 1 depicts an example embodiment of a motion capture system.

FIG. 1 depicts an example embodiment of a motion capture system 10 in which a human 8 interacts with an application, such as in the home of a user. The motion capture system 10 includes a display 196, a depth camera system 20, and a computing environment or apparatus 12. The depth camera system 20 may include an image camera component 22 having an illuminator 24, such as an infrared (IR) light emitter, one or more image sensors 26, such as an infrared camera, and a red-green-blue (RGB) camera 28. A human 8, also referred to as a user, person or player, stands in a field of view 6 of the depth camera. Lines 2 and 4 denote a boundary of the field of view 6. In this example, the depth camera system 20, and computing environment 12 provide an application in which an avatar 197 on the display 196 track the movements of the human 8. For example, the avatar may raise an arm when the human raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track one or more human targets. The computing environment 12 can include a computer, a gaming system or console, or the like, as well as hardware components and/or software components to execute applications.

The depth camera system 20 may include a camera which is used to visually monitor one or more people, such as the human 8, such that gestures and/or movements performed by the human may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The human 8 may be tracked using the depth camera system 20 such that the gestures and/or movements of the user are captured and used to animate an avatar or on-screen character and/or interpreted as input controls to the application being executed by computer environment 12.

Some movements of the human 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the human 8 may be available, used, and analyzed in any suitable manner to interact with an application.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the human 8.

Figure 2:
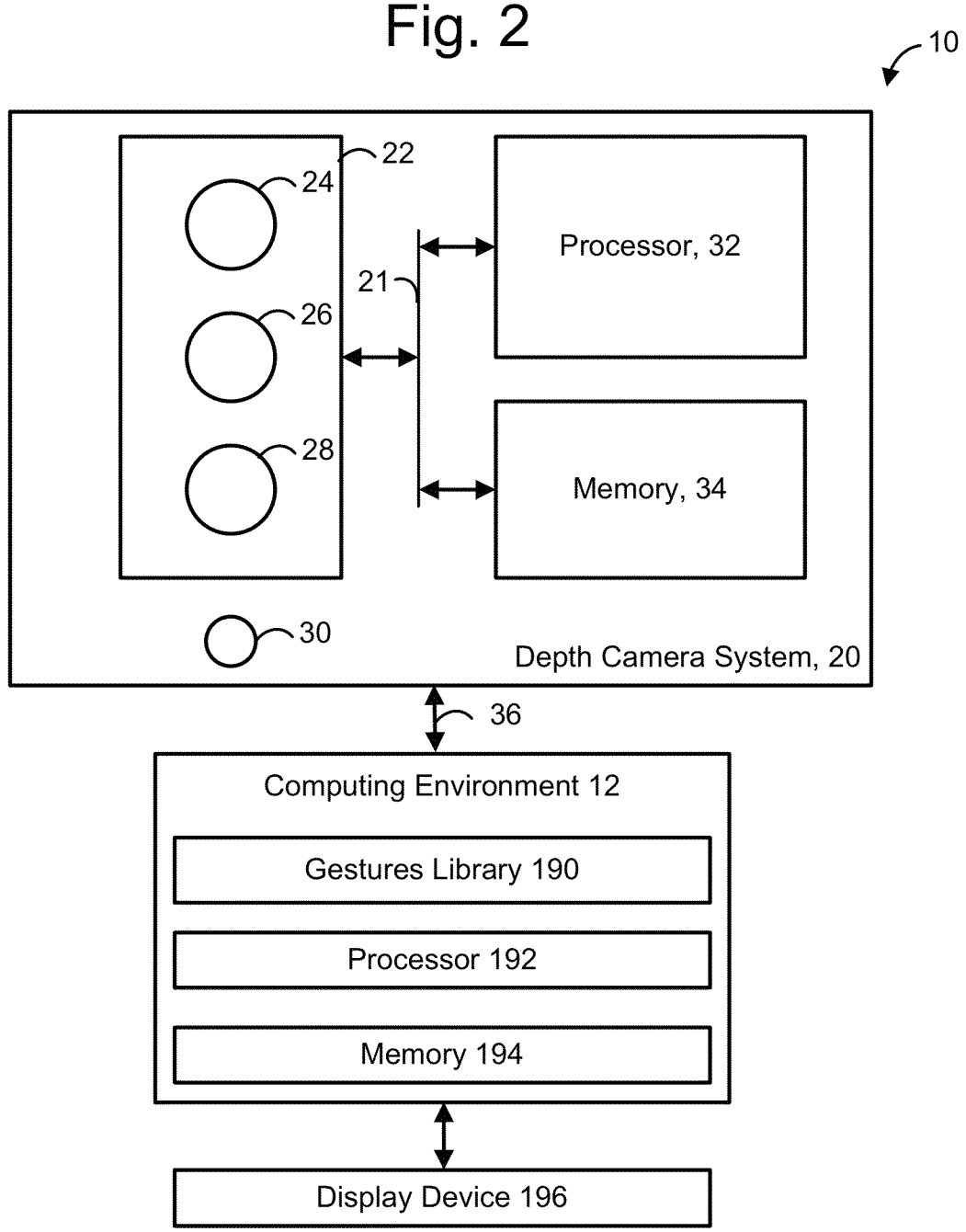
FIG. 2 depicts an example block diagram of the motion capture system of FIG. 1.

FIG. 2 depicts an example block diagram of the motion capture system of FIG. 1. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22 that captures the depth image of a scene in a physical space. The depth image may include a two-dimensional (2-D) pixel area of the captured scene, where each pixel in the 2-D pixel area has an associated depth value which represents a linear distance from the image camera component 22, thereby providing a 3-D depth image.

The image camera component 22 may include an illuminator 24, such an infrared (IR) light emitter 24, one or more image sensors 26, such as an infrared camera, and a red-green-blue (RGB) camera 28 that may be used to capture the depth image of a scene. A 3-D depth camera is formed by the combination of the infrared emitter 24 and the infrared camera 26. For example, in a time-of-flight analysis, the illuminator 24 emits infrared light onto the physical space and the image sensor 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system 20 to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the illuminator 24. Upon striking the surface of one or more targets or objects in the scene, the pattern may become deformed in response. Such a deformation of the pattern may be captured by, for example, the image sensor 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the 3-D depth camera 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the image sensor 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 3:
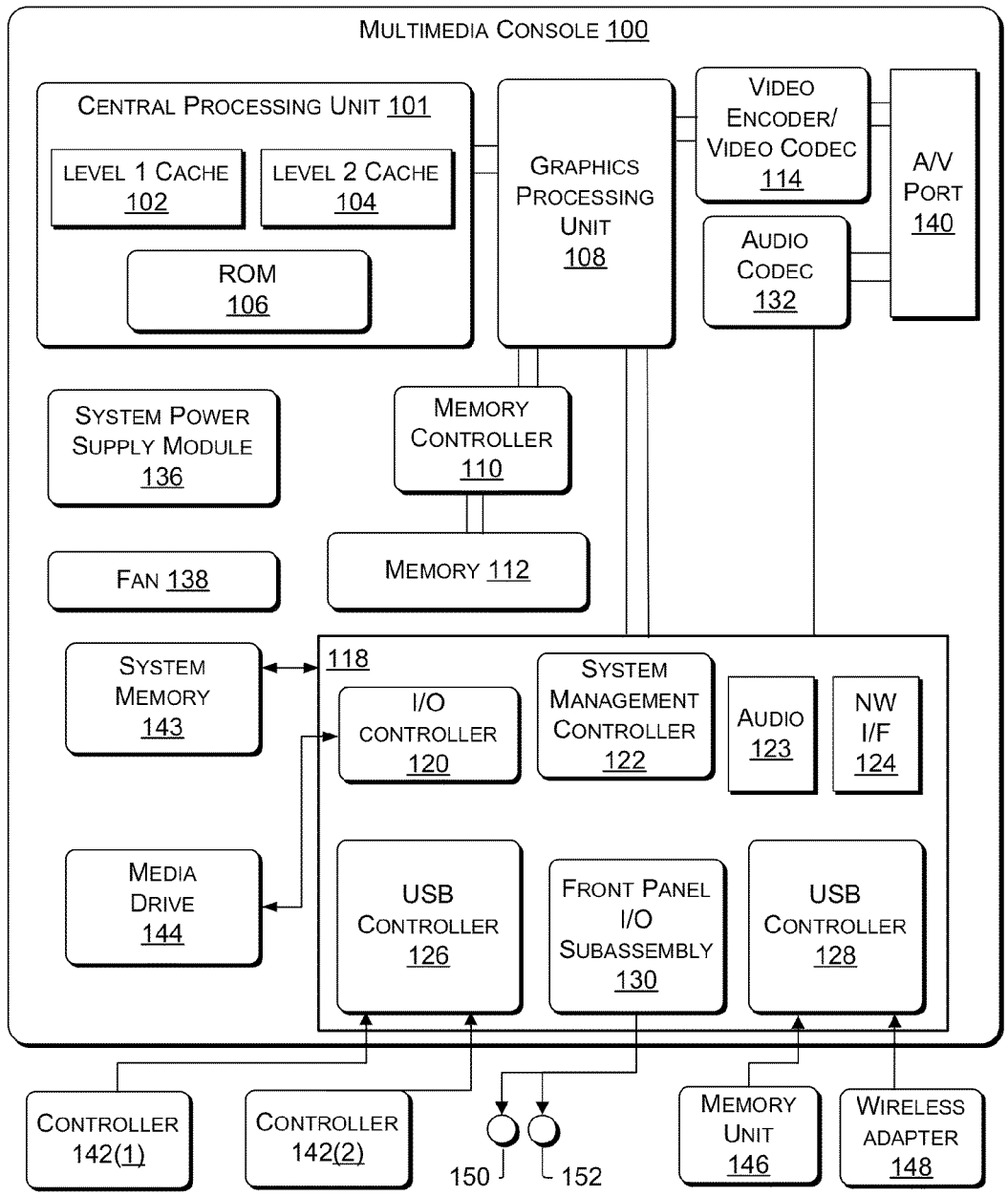
FIG. 3 depicts an example block diagram of a computing environment that may be used in the motion capture system of FIG. 1.

FIG. 3 depicts an example block diagram of a computing environment that may be used in the motion capture system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
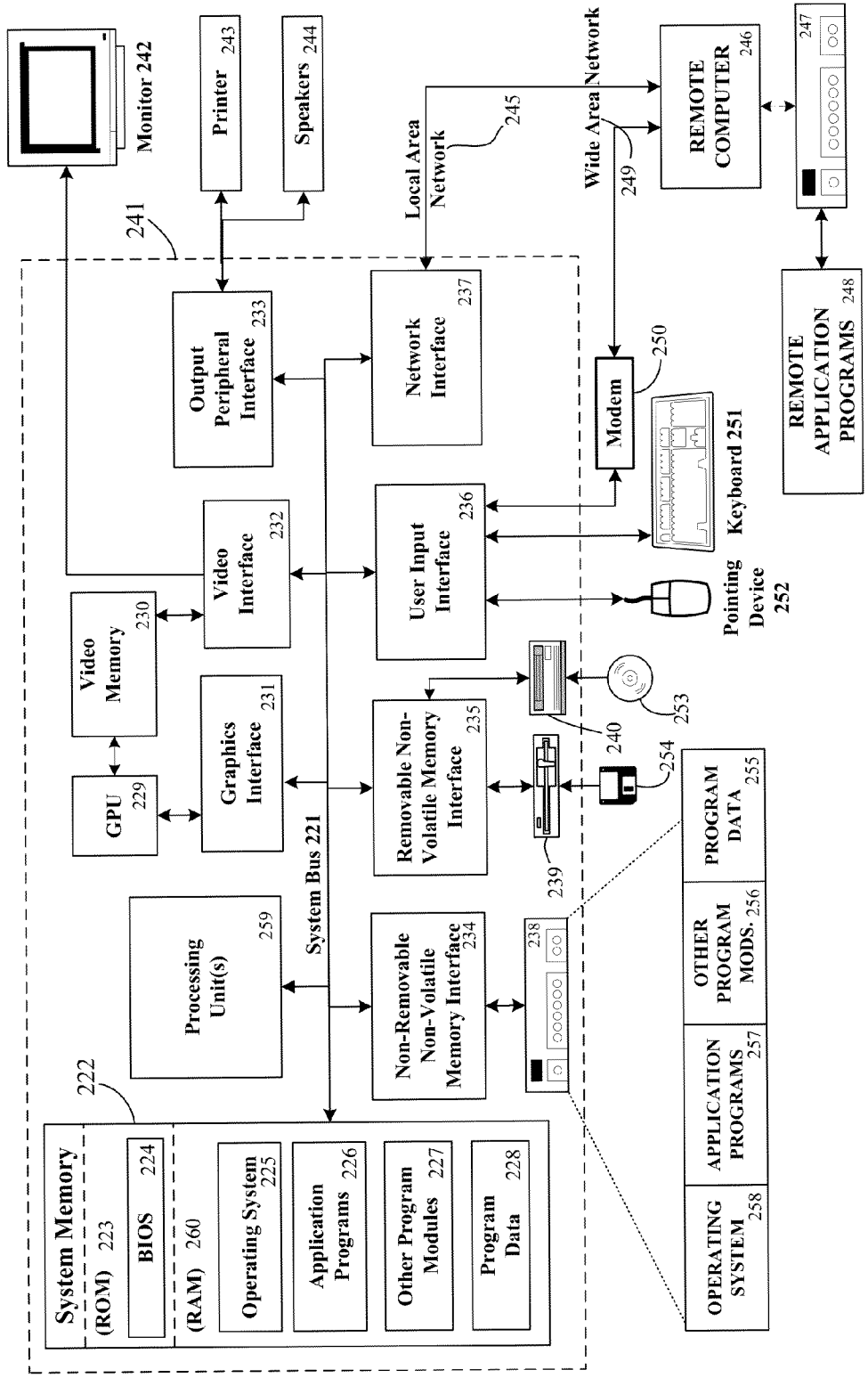
FIG. 4 depicts another example block diagram of a computing environment that may be used in the motion capture system of FIG. 1.

FIG. 4 depicts another example block diagram of a computing environment that may be used in the motion capture system of FIG. 1. In a motion capture system, the computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

The computing environment can include tangible computer readable storage having computer readable software embodied thereon for programming at least one processor to perform a method for generating proxy training data for human body tracking as described herein. The tangible computer readable storage can include, e.g., one or more of components 222, 234, 235, 230, 253 and 254. Further, one or more processors of the computing environment can provide a processor-implemented method for generating proxy training data for human body tracking, comprising processor-implemented steps as described herein. A processor can include, e.g., one or more of components 229 and 259.

Figure 5:
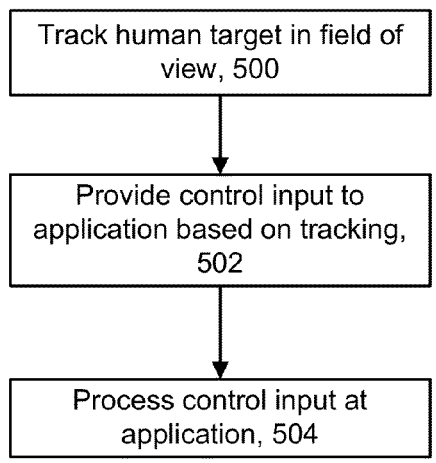
FIG. 5 depicts a method for tracking a human target in a motion capture system.

FIG. 5 depicts a method for tracking a human target in a motion capture system. Step 500 includes tracking a human target or user in a field of view of a depth camera system. A human target refers to, e.g., one or more people in a field of view of a depth camera system. For further details, see, e.g., FIG. 6. Step 502 includes providing a control input to an application based on the tracking For instance, the control input which represents a motion, such as a gesture, or a posture of a user. Step 504 includes processing the control input at the application. For example, this could include updating the position of an avatar on a display, where the avatar represents the user, as depicted in FIG. 1, selecting a menu item in a user interface (UI), or many other possible actions.

Figure 6:
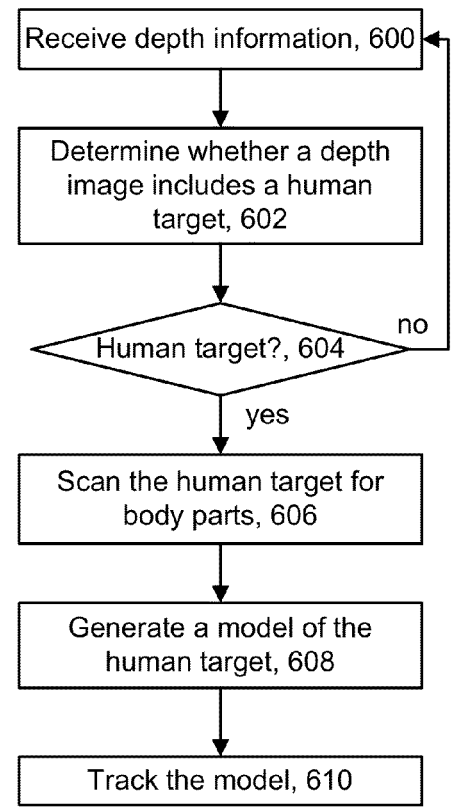
FIG. 6 depicts an example method for tracking movement of a human target as set forth in step 500 of FIG. 5.

FIG. 6 depicts an example method for tracking a human target as set forth in step 500 of FIG. 5. The example method may be implemented using, for example, the depth camera system 20 and/or the computing environment 12, 100 or 420 as discussed in connection with FIGS. 2-4. One or more human targets can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with an application that is executed by the computing environment. The scan to generate the model can occur when an application is started or launched, or at other times as controlled by the application of the scanned person.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image or map having a plurality of observed pixels, where each observed pixel has an observed depth value, as discussed. Further details of step 600 are provided further below.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information such that the depth information may used to generate a model such as a skeletal model (see FIG. 27).

Step 602 determines whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If the depth image includes a human target, at decision step 604, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 608 includes generating a model of the human target. In one embodiment, measurement values determined by the scanned bitmask may be used to define one or more joints in a skeletal model. The one or more joints are used to define one or more bones that correspond to a body part of a human. See also FIG. 27.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

Figure 7:
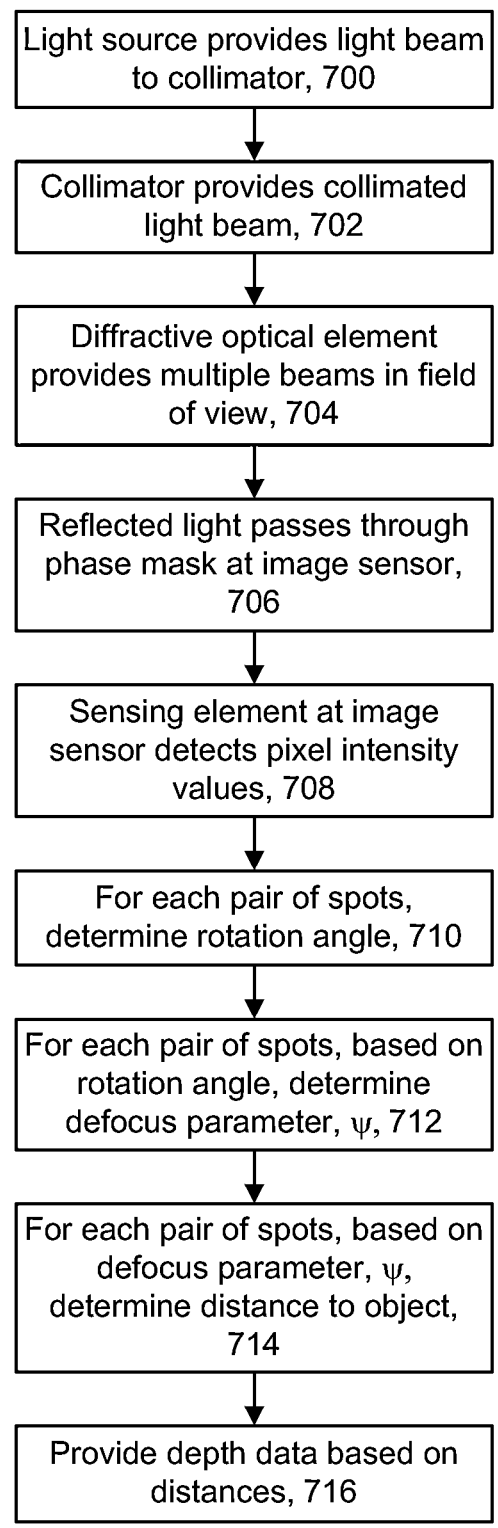
FIG. 7 depicts an example method for receiving depth information as set forth in step 600 of FIG. 6.

FIG. 7 depicts an example method for receiving depth information as set forth in step 600 of FIG. 6. Steps 700-704 may be performed by an illuminator, and steps 706-716 may be performed by an image sensor, which can include, or otherwise be associated with, one or more processors. At step 700, a light source provides a light beam to a collimator. At step 702, the collimator receives the light beam and provides a collimated light beam. At step 704, the collimated light beam is provided to a diffractive optical element, which provides multiple diffracted beams in a field of view, such as a room in a home.

At step 706, reflected light from the field of view passes through a phase mask at an image sensor. The reflected light can be visible or invisible light, such as near infrared light. At step 708, a sensing element at the image sensor detects pixel intensity values for the light which passed through the phase mask. The detected light includes many pairs of spots for which a rotation angle can be determined at step 710. At step 712, for each pair of spots, based on the associated rotation angle, a defocus parameter $\psi$ is determined. At step 714, for each pair of spots, based on the associated defocus parameter $\psi$, a distance to the object from the illuminator is determined. At step 716, depth data is provided based on the distances. For example, this can be in the form of a depth map, where each pixel is associated with a depth value.

Figure 8:
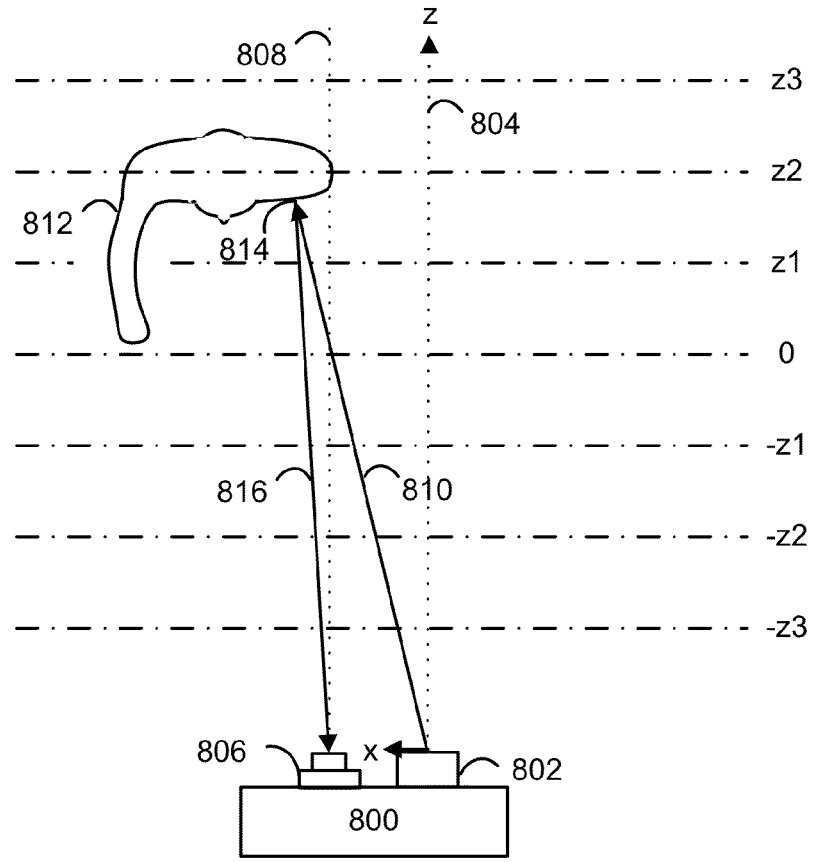
FIG. 8 depicts an example scenario in which depth information is provided as set forth in step 600 of FIG. 6, using an illuminator and an image sensor.

FIG. 8 depicts an example scenario in which depth information is provided as set forth in step 600 of FIG. 6, using an illuminator and an image sensor. A depth camera 800 includes an illuminator 802 which outputs light in a field of view, and an image sensor 806 which senses reflected light from the field of view. The illuminator and the image sensor have respective optical axes 804 and 808, respectively. The illuminator outputs an example light ray or beam 810 toward an object such as a human target 812. The human target is holding up his or her right arm in this example. At a particular portion 814 of the human target, the light beam is reflected in a ray 816 which is sensed by the image sensor. A continuum of rays will be output by the illuminator, reflected by the object, and sensed by the image sensor. Various depths or distances from the depth camera, along the optical axes, are depicted, including a depth z0, which represents a reference focus depth or focal length, distances z1, z2 and z3 which are progressively further from the depth camera, and distances −z1, −z2 and −z3 which are progressively closer to the depth camera. As explained further below, a range of depths can be considered to be a defocus range in which the object 812 is out of focus. The reference focus depth is likely the best focus depth, but this could change within the field of view.

Figure 9:
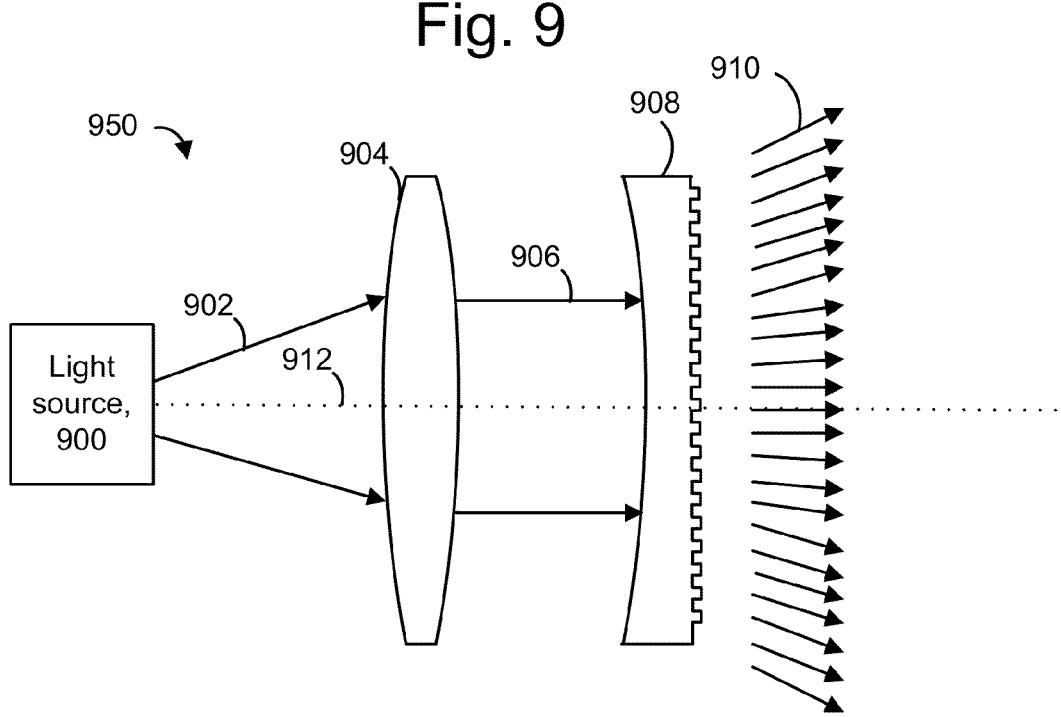
FIG. 9 depicts a more detailed view of the illuminator 802 of FIG. 8.

FIG. 9 depicts a more detailed view of the illuminator 802 of FIG. 8. A light source 900 such as one or more LEDs or lasers can be used to provide a light beam 902 to a collimating lens 904, which in turn provides a collimated light beam 906 to a diffractive optical element 908, in one possible implementation. The diffractive optical element 908 outputs multiple diffracted light beams 910 across a pattern which defines the field of view.

Generally, a diffractive optical element is used as a beam replicator which generates many beams of the same geometry, with each beam traveling to a different location in the field of view. Each beam is denoted by a diffraction order with the zero order being the beam which passes straight through the diffractive optical element. The diffractive optical element provides multiple smaller light beams from a single collimated light beam. The smaller light beams define a field of view of a depth camera in a desired predetermined pattern. For example, in a motion tracking system, it may be desired to illuminate a room in a way which allows tracking of a human target who is standing or sitting in the room. To track the entire human target, the field of view should extend in a sufficiently wide angle, in height and width, to illuminate the entire height and width of the human and an area in which the human may move around when interacting with an application of a motion tracking system. An appropriate field of view can be set based on factors such as the expected height and width of the human, including the arm span when the arms are raised overhead or out to the sides, the size of the area over which the human may move when interacting with the application, the expected distance of the human from the camera and the focal length of the camera.

For example, the field of view may be sufficient to illuminate a human standing 3-15 feet or more from the camera, where the human with arm span is seven feet high and six feet wide, and the human is expected to move in an area of +/−6 feet of a central location, e.g., in a floor area of 144 square feet. The defocus range can be set based on an expected range of depths in which the human may move or be present. In other cases, the field of view can be designed to illuminate only the upper body area of a human. A reduced field of view may be acceptable when it is known that the user will likely be sitting down instead of standing up and moving around. The field of view can similarly be designed to illuminate an object other than a human. The diffractive optical element 908 may provide many smaller light beams, such as thousands of smaller light beams, from a single collimated light beam. Each smaller light beam has a small fraction of the power of the single collimated light beam. The smaller, diffracted light beams may have a nominally equal intensity.

The lens 904 and the diffractive optical element 908 have a common optical axis 912.

Figure 10:
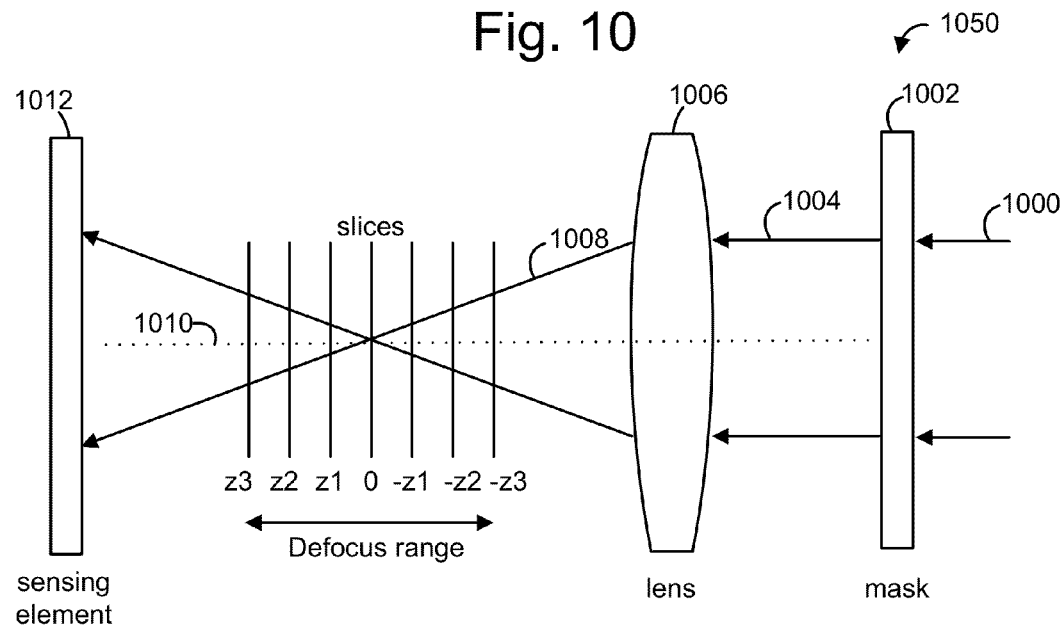
FIG. 10 depicts a more detailed view of the image sensor 806 of FIG. 8.

FIG. 10 depicts a more detailed view of the image sensor 806 of FIG. 8. An image sensor 1050 can include a phase mask 1002, a lens 1006 and a sensing element 1012 arranged along an optical axis 1010. The phase mask is what creates the double helix pattern. The phase mask can be created using well known techniques such as photolithography to create regions of different heights on a glass surface to create the specific phase required to create the double helix. The sensing element can include a CMOS image sensor having a grid of pixels, for instance, which each sense a light intensity level, so that a distribution of the light intensity in the field of view is obtained. Reflected light 1000 from the field of view passes through the phase mask 1002 to provide a phase-encoded collimated light beam 1004 which passes through the lens 1006. This light in turn reaches the sensing element 1012. The image sensor has a defocus range from −z3 to z3. Each depth is a slice which corresponds to a like-named depth in FIG. 8. The phase mask 1002, lens 1006 and sensing element 1012 have a common optical axis 914.

Figure 11:
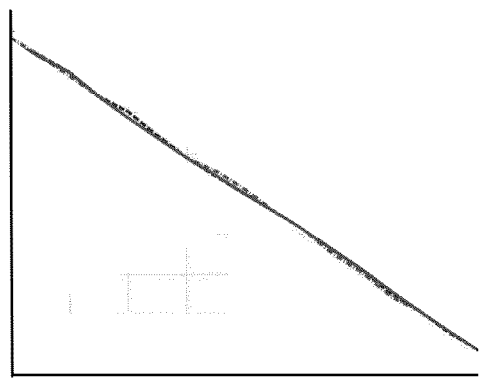
FIG. 11 depicts a rotation angle versus a defocus parameter for the light detected by the image sensor of FIG. 10.

FIG. 11 depicts a rotation angle versus a defocus parameter for the light provided by the illuminator of FIG. 9. The rotation angle is an angle defined by two light spots (see FIG. 13). For example, the angle can be defined as an angle between a straight line between the two light spots and a reference axis such as a horizontal axis. The rotation angle can be defined at any depth, and rotates by 180 degrees over a certain depth range. For tracking of a human target in a motion capture system, typically, the depth range can be, e.g., at least 1 meter (m). This is in contrast to some applications such as for microscopic imaging of tissue which use a much smaller depth range of, e.g., a few micrometers, where one micrometer is $10^{-6}$ m. In this predefined depth range, which is a function of the optical components, each rotation can be uniquely mapped to a depth which is meaningful in a motion capture system, such as for tracking a human target. A given rotation can also be mapped to depths outside the predefined depth range.

The rotation angle can be in a range of nearly 180 degrees. Results for light at wavelengths of 500, 550 and 600 nm is depicted. As indicated, there is a consistent rotation angle versus defocus parameter relationship for the different wavelengths. The defocus refers to a translation distance along the optical axis away from a plane or surface of a reference focus (e.g., at z=0 in FIG. 8). An optical system with a low f-number will have a shallow depth of focus, while a larger f-number will provide a larger depth of focus. The defocus parameter $\psi$ can be defined by $$\psi = \frac{2\pi}{\lambda}\left(\frac{1}{z_{obj}} - \frac{1}{z_{obj'}}\right)r^2$$

where $\lambda$ is the wavelength of the light, r is the aperture size, $z_{obj}$ is the reference focus depth, and $z_{obj'}$ is the actual object distance or depth.

Figure 12:
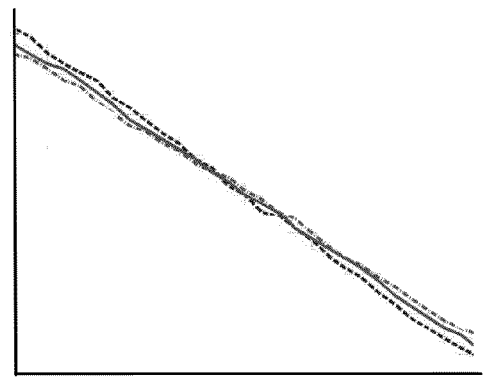
FIG. 12 depicts a rotation angle versus a depth for the light detected by the image sensor of FIG. 10.

FIG. 12 depicts a rotation angle versus a depth for the light detected by the image sensor of FIG. 10. Consistent results are obtained for light at wavelengths of 500, 550 and 600 nm. As indicated, there is a consistent rotation angle versus depth parameter relationship. The range of the depth can be set based on the optics of the depth camera.

Figure 13:
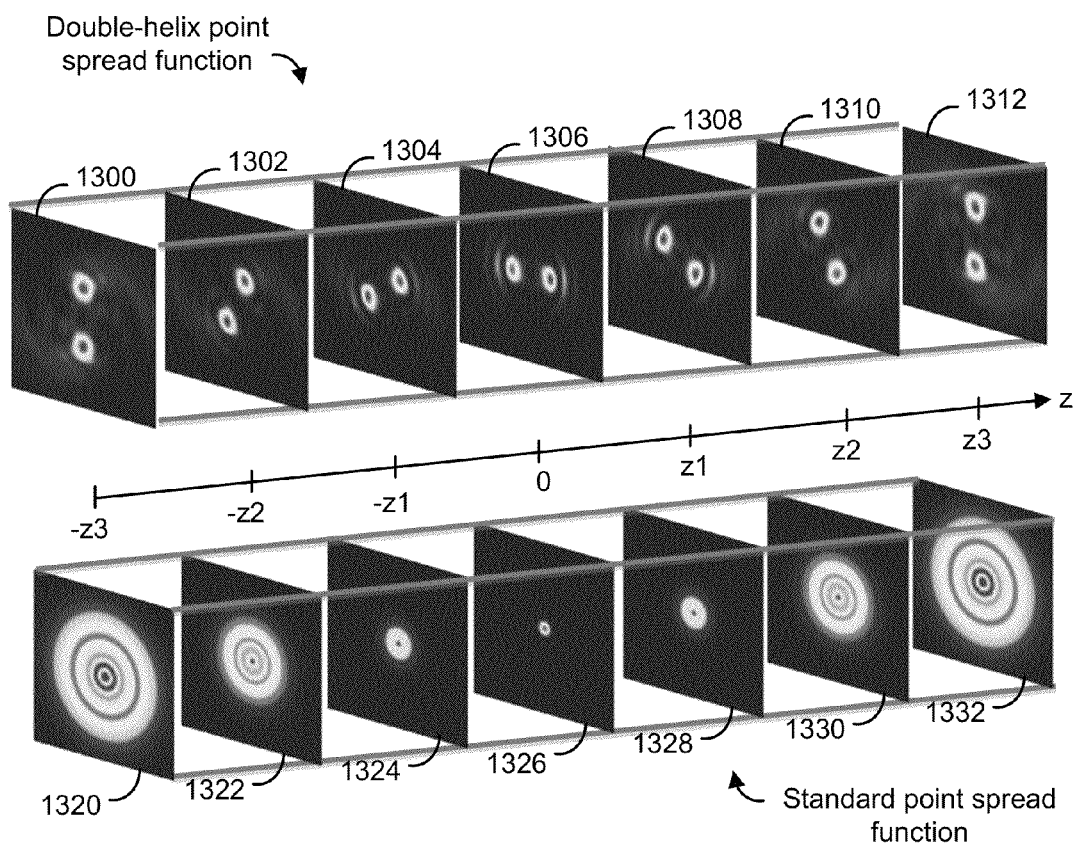
FIG. 13 depicts an illumination pattern of a double-helix point spread function and a standard point spread function at different depths.

FIG. 13 depicts an illumination pattern of a double-helix point spread function and a standard point spread function at different depths. Along a depth axis or z-axis, double-helix point spread distributions 1300, 1302, 1304, 1306, 1308, 1310 and 1312 are provided at depths of −z3, −z2, −z1, z0, z1, z2, z3, respectively. For comparison, standard point spread distributions 1320, 1322, 1324, 1326, 1328, 1330 and 1332 are provided at depths of −z3, −z2, −z1, z0, z1, z2, z3, respectively. The double-helix rotating point spread function (PSF) provides more defocus information than the standard PSF because the double-helix PSF rotates with defocus and expands more slowly than the standard PSF. The rotation angle information can thereby be used for estimation of defocus (depth) with greater accuracy.

One example method to achieve a double-helix PSF is by the super position of Laguerre-Gauss beams. The superposition of Laguerre-Gauss (LG) beam modes forms a self-imaging beam (with rotation and scaling). We use the complex field at one transverse plane of the beam as the amplitude transfer function of the target optical system. The PSF of the optical system is then double-helix. According to the Laguerre-Gauss mode:

$$U_{n,m}(r) = C_{n,m} G(\rho, z) R_{n,m}(\tilde{\rho}) \Phi_m(\varphi) Z_n(z)$$

$$\text{where } G(\rho, z) = \frac{1}{w(z)} \exp(-\tilde{\rho}^2) \exp\left(\frac{ik\rho^2}{2R(z)}\right) \exp(-i\psi(z))$$

$$R_{n,m}(\tilde{\rho}) = \left(\sqrt{2}\,\tilde{\rho}\right)^{|m|} L_{\frac{n-|m|}{2}}^{|m|}(2\tilde{\rho}^2)$$

$$\Phi_m(\varphi) = \exp(im\varphi)$$

$$Z_n(z) = \exp(in\psi(z))$$

$$\psi(z) = \arctan\left(\frac{z}{z_0}\right)$$

$$R(z) = z\left[1 + \left(\frac{z}{z_0}\right)^2\right]$$

$$C_{n,m} = \sqrt{\frac{2}{\pi \frac{\left[\frac{n-|m|}{2}\right]!}{\left[\frac{n+|m|}{2}\right]!}}}$$

$$\text{where } \tilde{\rho} = \frac{\rho}{w(z)}$$

is the radial coordinate, scaled by Gaussian spot size $$w(z) = w_0 \sqrt{1 + \left(\frac{z}{z_0}\right)^2},$$

with $$z_0 = \frac{\pi w_0^2}{\lambda}$$

as the Rayleigh length. The Rayleigh length is the distance along the propagation direction of a beam from the waist to the place where the area of the cross section is doubled, where $w_0$ is the beam waist.

$$L_{\frac{n-|m|}{2}}^{|m|}$$

are the generalized Laguerre polynomials and the integers n, m obey the relation: n=|m|, |m|+2, |m|+4, . . . .

For example, superposition of the LG modes (n,m): (1,1), (5,3), (9,5), (13,7), (17,9) gives rise to a double-helix rotating beam. A high-efficiency double-helix beam be obtained by optimization with the above beam as a start point, as discussed by S. R. P. Pavani and R. Piestun, "High-efficiency rotating point spread functions," Optical Express, vol. 16, no. 5, pp. 3484-3489, Mar. 3, 2008, incorporated herein by reference.

The double-helix PSF is obtained using a wavefront coding. Wavefront coding generally is a method for creating optical transfer functions of optical components such as lenses using one or more specially designed phase masks.

Figure 14:
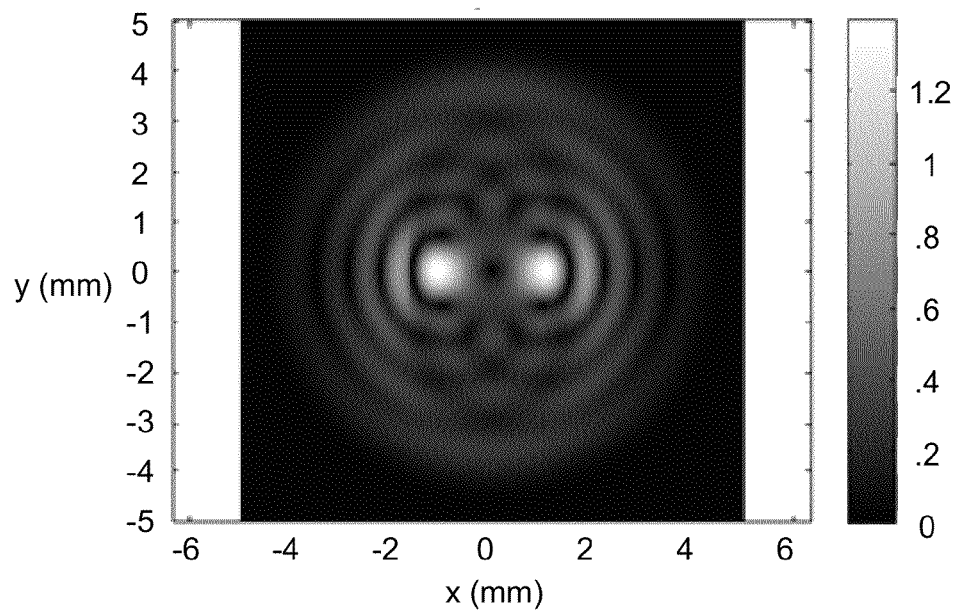
FIG. 14 depicts an amplitude of a light beam provided according to the double-helix point spread function of FIG. 13 at a depth of z=0.
Figure 15:
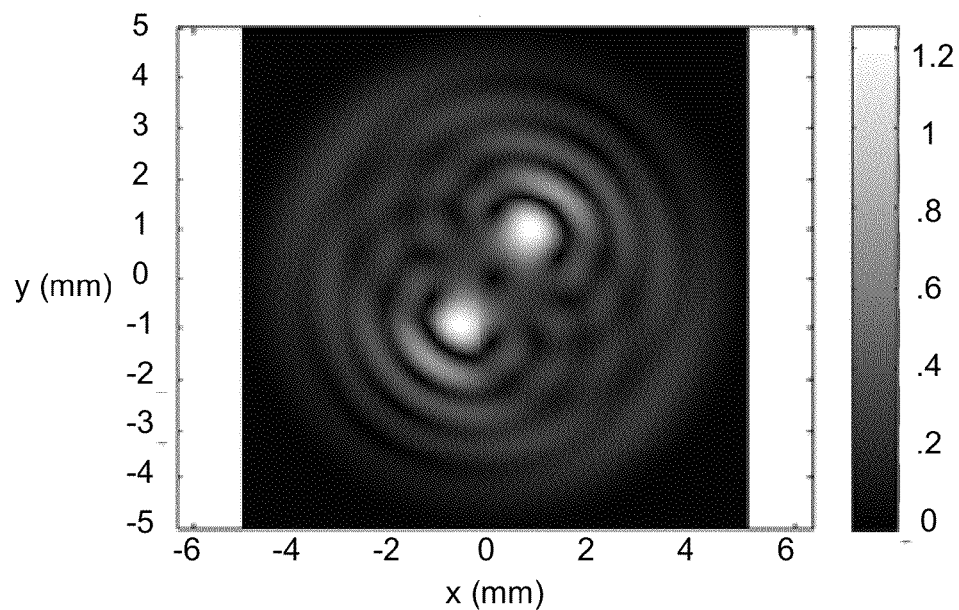
FIG. 15 depicts an amplitude of a light beam provided according to the double-helix point spread function of FIG. 13 at a depth of $z=z_0/2$.

FIGS. 14 and 15 shows the double-helix beam at different positions. In particular, FIG. 14 depicts an amplitude of a light beam provided according to the double-helix point spread function of FIG. 13 at a depth of z=0, representing the reference focus depth. Here, $w_0$=1 mm. The variation of the amplitude in the x-axis (horizontal) and y-axis (vertical) directions is depicted. The level of illumination ranges from lower illumination (black) to higher illumination (white). As seen, two distinct spots of light are provided as the white regions.

FIG. 15 depicts an amplitude of a light beam provided according to the double-helix point spread function of FIG. 13 at a depth of z=$z_0$/2, representing one-half the Rayleigh length $z_0$. The rotation between the two spots is apparent. 15

Figure 16:
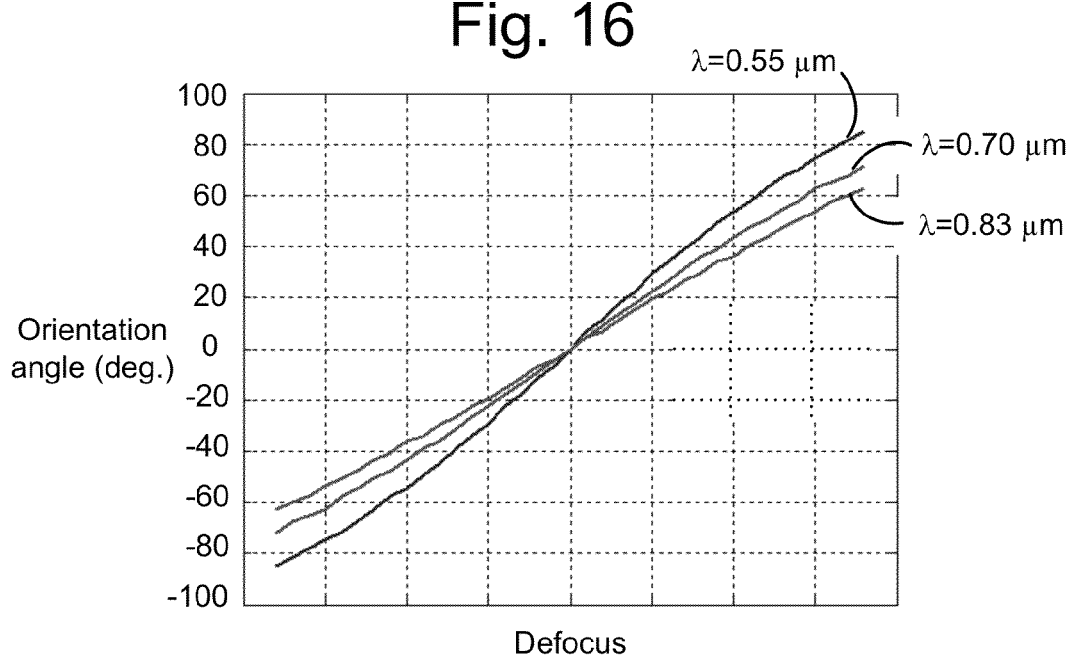
FIG. 16 depicts an orientation angle versus defocus position according to the double-helix point spread function of FIG. 13 for different wavelengths of light.

FIG. 16 depicts an orientation angle versus defocus position according to the double-helix point spread function of FIG. 13 for different wavelengths of light, namely 0.55 μm, 0.70 μm and 0.83 μm. Regarding the rotation of PSF across the focus plane, we can use the complex field of the double-helix beam (at z=0) to be the amplitude transfer function, such as by putting it on the exit pupil of the illuminator of the depth camera. The exit pupil is a virtual aperture in an optical system. Only rays which pass through this virtual aperture can exit the system.

Figure 17:
FIG. 17 depicts a distance between spots versus defocus position, corresponding to FIG. 16.

FIG. 17 depicts a distance between spots versus defocus position, corresponding to FIG. 16. The distance becomes shorter as the wavelength becomes shorter. The scale of the distance depends on the specific implementation.

Figure 18:
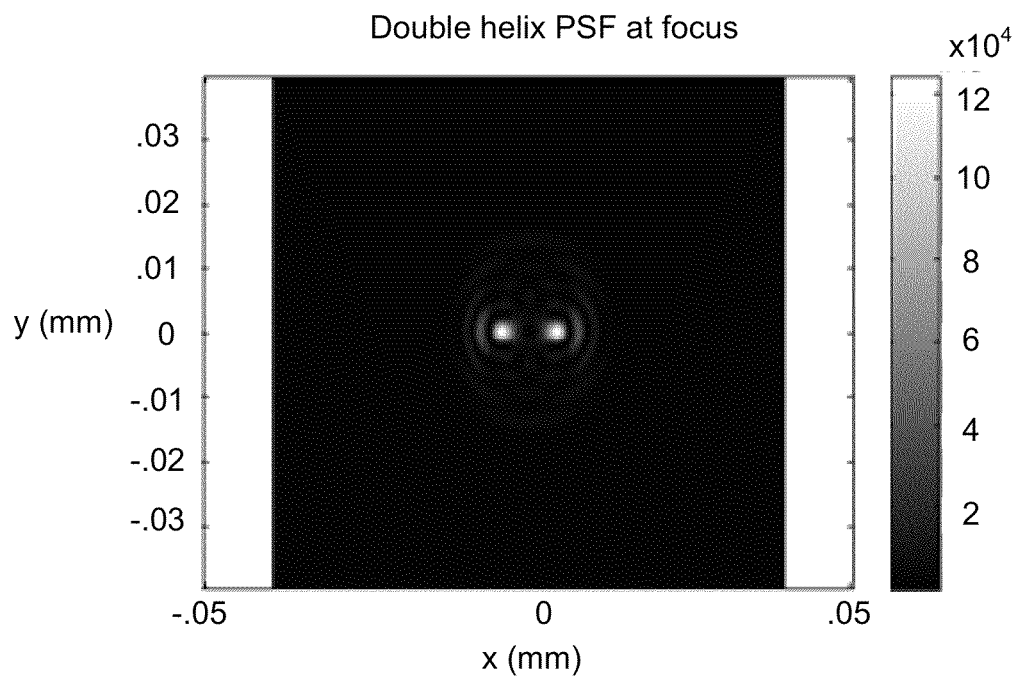
FIG. 18 depicts a light beam provided according to the double-helix point spread function of FIG. 13 at focus.
Figure 19:
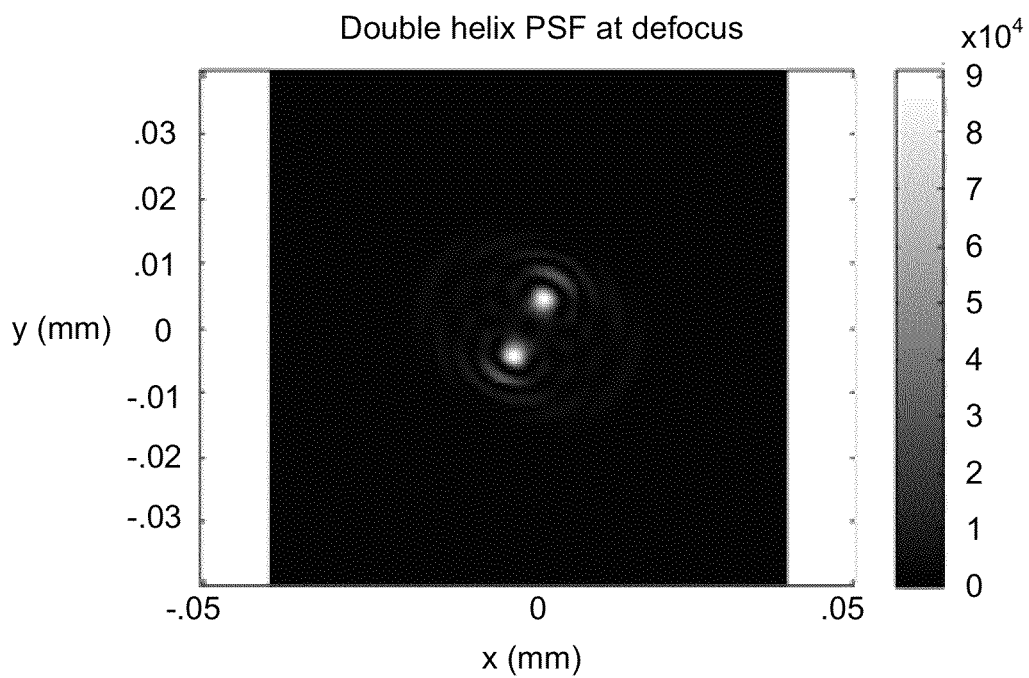
FIG. 19 depicts a light beam provided according to the double-helix point spread function of FIG. 13 at defocus.

FIGS. 18 and 19 shows the intensity PSF function at different image planes. In particular, FIG. 18 depicts a light beam provided according to the double-helix point spread function of FIG. 13 at focus, and FIG. 19 depicts a light beam provided according to the double-helix point spread function of FIG. 13 at defocus. The two spots can clearly be seen, along with the rotation of the two spots based on distance from the depth camera. The two spots are arranged horizontally when in focus, and at an angle to the horizontal when in defocus. Lighter regions have a higher sensed illumination.

Figure 20A:
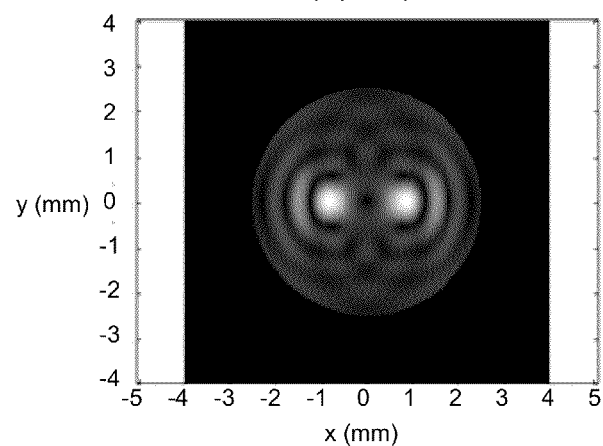
FIG. 20A depicts an exit pupil amplitude for a light beam provided according to the double-helix point spread function of FIG. 13.
Figure 20B:
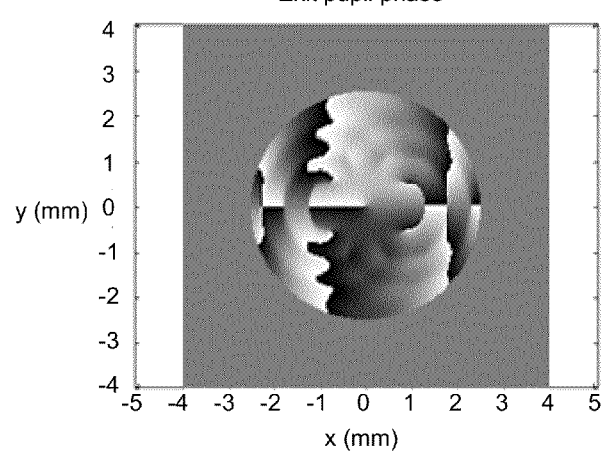
FIG. 20B depicts an exit pupil phase associated with the amplitude of FIG. 20A.

FIG. 20A depicts an exit pupil amplitude for a light beam provided according to the double-helix point spread function of FIG. 13. FIG. 20B depicts an exit pupil phase associated with the amplitude of FIG. 20A. Consider an imaging system with F#=3 (f-number, also referred to as focal ratio or f-stop). We apply the complex field of the double-helix beam to the exit pupil of the system. Due to the finite pupil size, the complex field of the double-helix beam is actually truncated to fit the exit pupil. The effect of this truncation is not significant if the double-helix field is well within the pupil size. Here we use a double-helix beam generated with LG modes of Gaussian beam waist size of $w_0=0.8$ mm. The exit pupil function is shown in FIGS. 20A and 20B.

Figure 21:
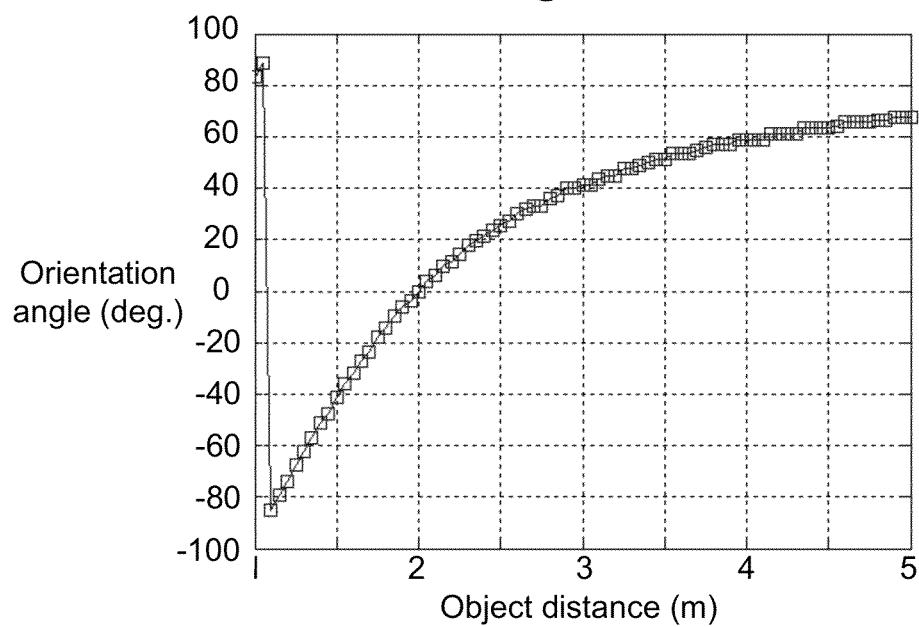
FIG. 21 depicts an orientation angle versus object distance for a light beam provided according to the double-helix point spread function of FIG. 13.

FIG. 21 depicts an orientation angle versus object distance for a light beam provided according to the double-helix point spread function of FIG. 13. The angle transitions from about −90 degrees at 1 m to about +90 degrees at about 5 m, in this example. The angle is zero degrees at 2 m. The image plane is at its paraxial focus plane for a nominal object distance of 2 meters.

Figure 22A:
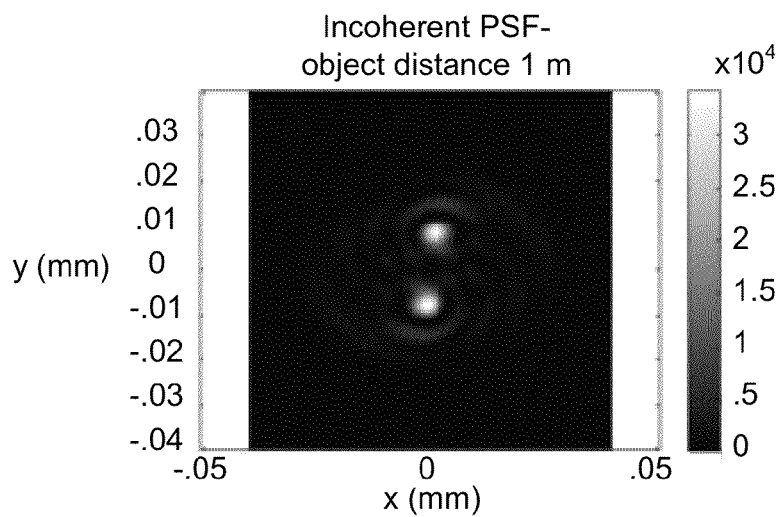
FIGS. 22A, 22B, 22C, 22D, 22E and 22F depict an incoherent point spread function at object distances of 1, 1.5, 2, 3, 4 and 5 m, respectively, consistent with FIG. 21.
Figure 22B:
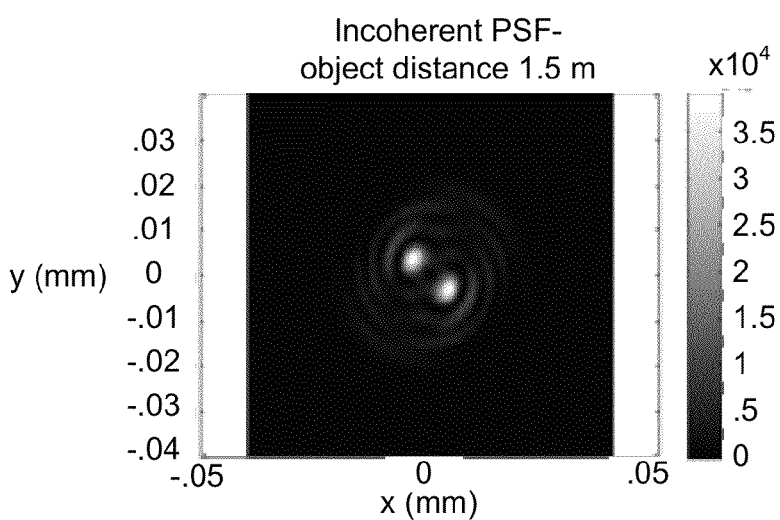
Figure 22C:
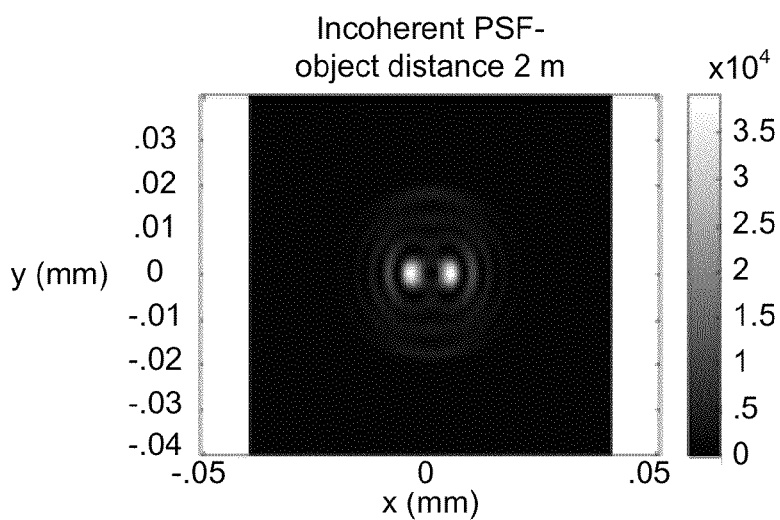
Figure 22D:
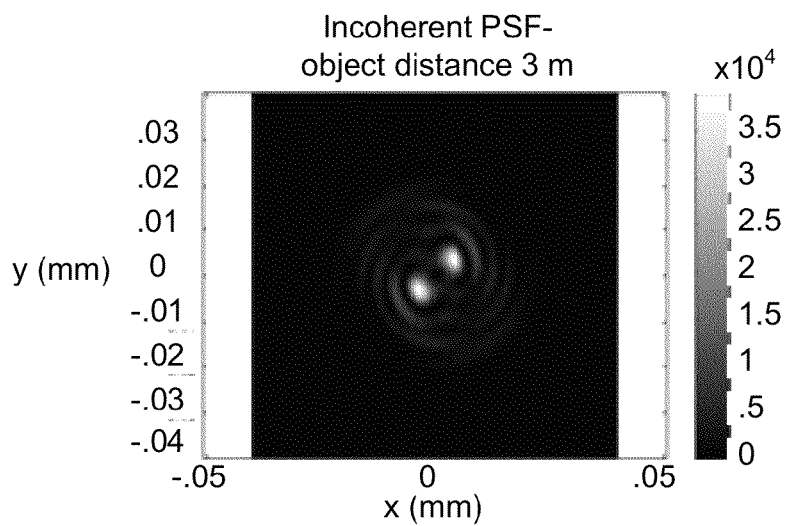
Figure 22E:
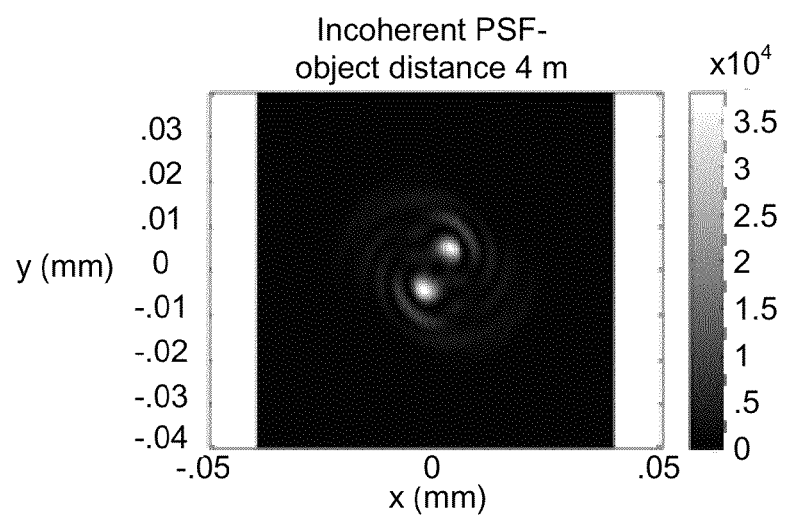
Figure 22F:
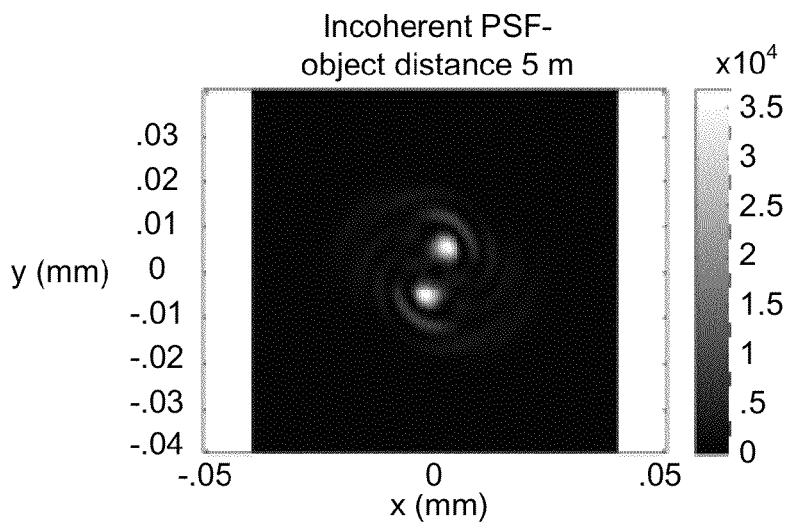

FIGS. 22A, 22B, 22C, 22D, 22E and 22F depict an incoherent point spread function at object distances of 1, 1.5, 2, 3, 4 and 5 m, respectively, consistent with FIG. 21. Specifically, in FIG. 22A, the rotation angle is about −90 degrees, indicating a distance of 1 m. In FIG. 22B, the rotation angle is about −40 degrees, indicating a distance of 1.5 m. In FIG. 22C, the rotation angle is zero degrees, indicating a distance of 2 m. In FIG. 22D, the rotation angle is about 40 degrees, indicating a distance of 3 m. In FIG. 22E, the rotation angle is about 60 degrees, indicating a distance of 4 m. In FIG. 22F, the rotation angle is about 90 degrees, indicating a distance of 5 m. Thus, 1-5 m is an example depth range in which the depth of a human or other object can be determined.

Figure 23:
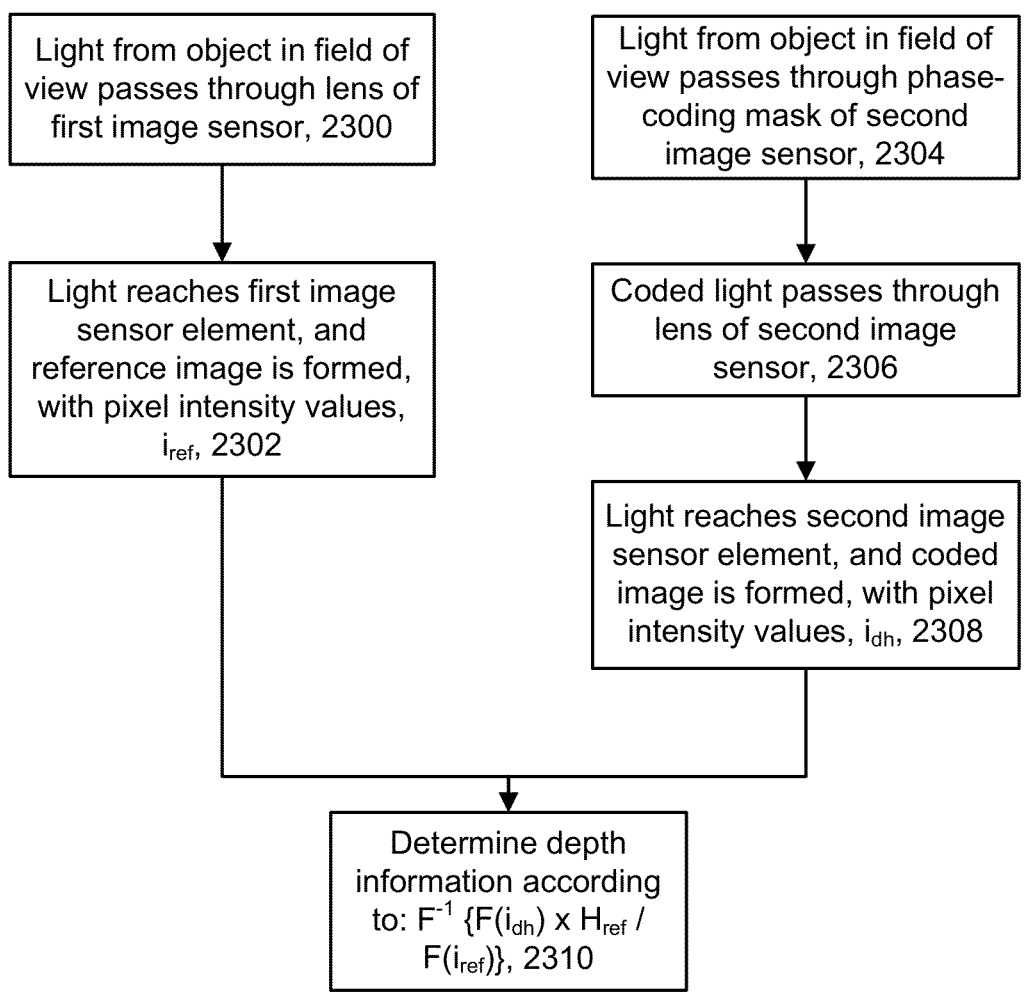
FIG. 23 depicts a method for tracking a human target in a motion capture system using dual image sensors.
Figure 25:
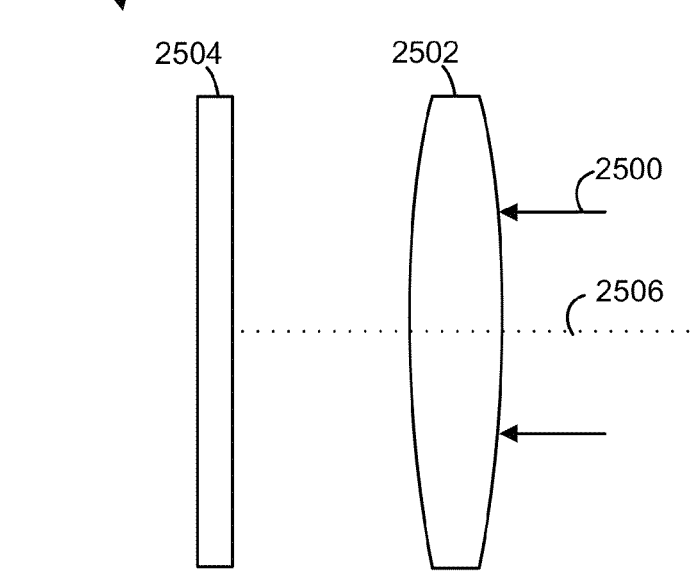
FIG. 25 depicts the first image sensor 2402 of FIG. 24 which does not have a phase mask.

FIG. 23 depicts a method for tracking a human target in a motion capture system using dual image sensors. In this approach, two or more image sensors are used to obtain images of a scene, such as a room in which a person is moving while interacting with a motion capture system. This approach does not rely on any particular type of illumination of the scene by an illuminator of a depth camera system, and can work with no illumination at all by a depth camera system. We have one imager without a phase mask and one imager with a phase mask. We can then deconvolve the phase using a variety of techniques. Steps 2300-2302 refer to steps associated with an imager without a phase mask, such as depicted in FIG. 25, and steps 2304-2308 refer to steps associated with the imager with a phase mask, such as depicted in FIG. 10. Steps 2300-2302 can occur at the same time as steps 2304-2308 so that dual images of a scene are obtained at the same point in time. At step 2300, light from an object in the field of view passes through the lens of a first image sensor. The field of view can be considered to be that of an image sensor, e.g., a region of a scene which the image sensor can sense. At step 2302, the light reaches the first image sensor element, and a reference image is formed with pixel intensity values $i_{ref}$. Each pixel in the image sensor may detect light having an associated intensity or amplitude. The set of $i_{ref}$ values in an image represents an image intensity distribution of the image. In one approach, no phase-coding mask is used by the first image sensor.

At step 2304, light from an object in the field of view passes through a phase-coding mask of a second image sensor, to produce phase-coded light. This can be similar to the mask 1002 of FIGS. 10, for instance. At step 2306, the phase-coded light passes through the lens of the second image sensor. At step 2308, the phase-coded light reaches the second image sensor element and a phase-coded image is formed, with pixel intensity values $i_{dh}$. The subscript "dh" represents the double helix point spread function which is used to coded the light received by the second image sensor. The set of $i_{dh}$ values in an image represents an image intensity distribution of the image.

Step 2310 determines depth information according to the relationship: $F^{-1}\{F(i_{dh}) \times H_{ref}/F(i_{ref})\}$, where F denotes a Fourier transform, $F^{-1}$ denotes an inverse Fourier transform, and $H_{ref}$ is an optical transfer function of a point spread function of the reference image, as described further below.

Figure 24:
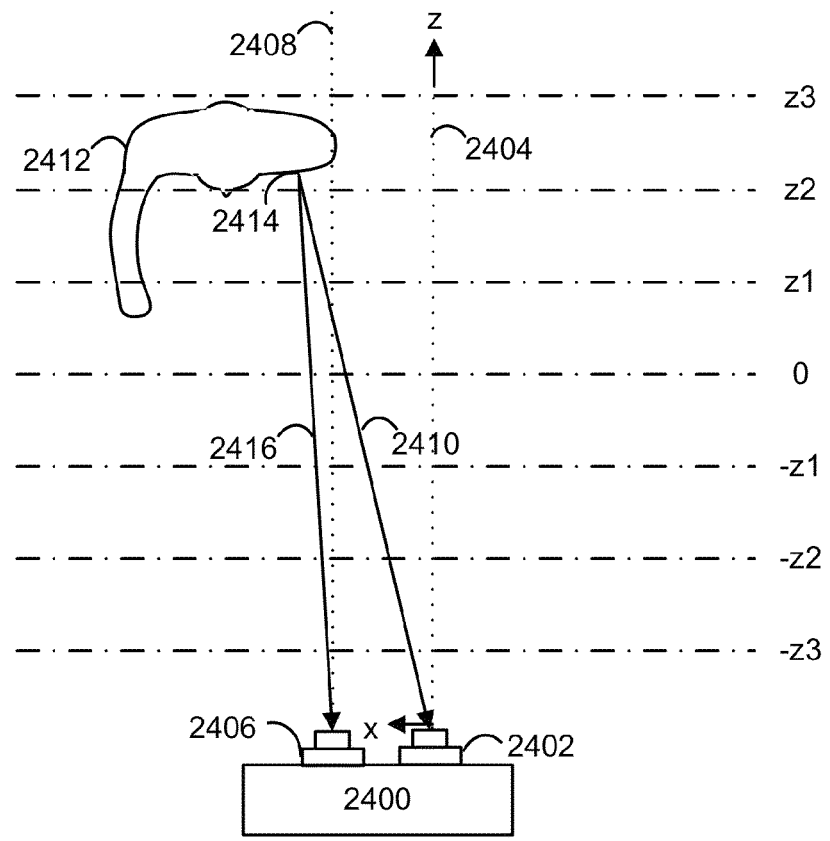
FIG. 24 depicts another example scenario in which depth information is provided as set forth in step 600 of FIG. 6, using dual image sensors.

FIG. 24 depicts another example scenario in which depth information is provided as set forth in step 600 of FIG. 6, using dual image sensors. As mentioned, no illuminator is needed, thereby reducing the size, cost and power consumption of the depth camera 2400. Additionally, safety concerns are avoided compared to the case where a laser is used in the illuminator. The depth camera 2400 includes a first image sensor 2402 and a second image sensor 2406 which have respective optical axes 2404 and 2408, respectively. The first image sensor 2402 may be an imager without a phase mask, such as depicted in FIG. 25, and the second image sensor 2406 may be an imager with a phase mask, such as depicted in FIG. 10.

Light is emitted from a particular portion 2414 of the human target 2412 in a ray 2410 which is sensed by the first image sensor, and in a ray 2416 which is sensed by the second image sensor 2406. A continuum of rays will be output by the human target, from different portions of the human target, and sensed by the image sensors. Various depths or distances from the depth camera, along the optical axes, are depicted, including a depth z0, which represents a reference focus depth or focal length, distances z1, z2 and z3 which are progressively further from the depth camera, and distances −z1, −z2 and −z3 which are progressively closer to the depth camera, similar to FIG. 8.

FIG. 25 depicts the first image sensor 2402 of FIG. 24 which does not have a phase mask. In the image sensor 2550, light 2500 from a scene passes through a lens 2502 and from there to an imaging element 2504 such as a CMOS (complementary metal oxide semiconductor) image sensor. The lens 2502 and imaging element 2504 may have a common optical axis 2506.

Figure 26A:
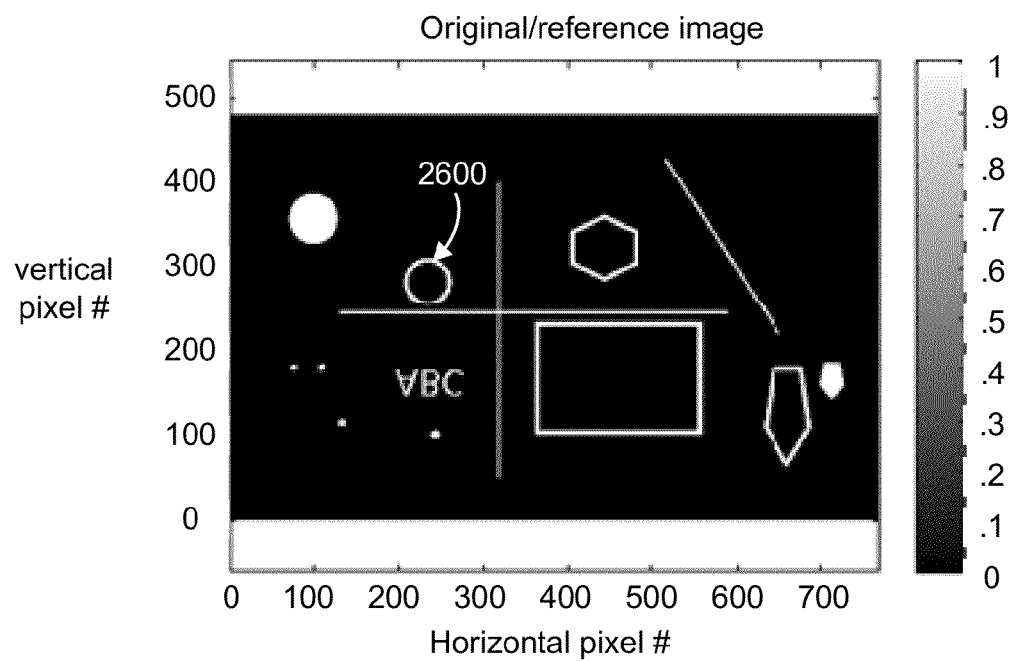
FIG. 26A depicts a reference image in the example scenario of FIG. 24.
Figure 26B:
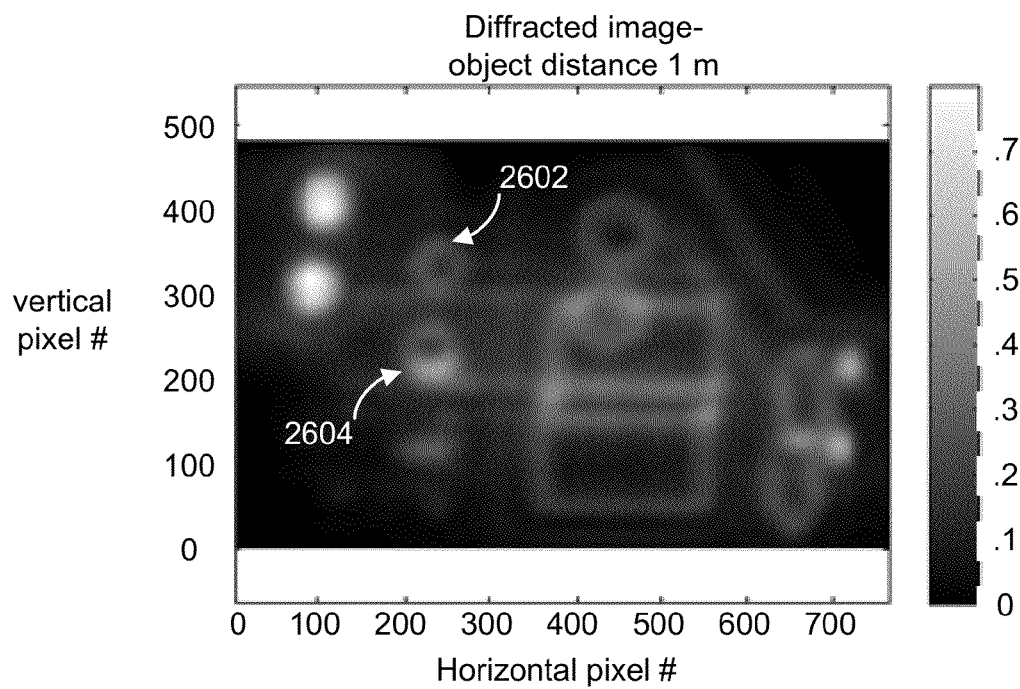
FIGS. 26B, 26C and 26D depict a diffracted image at an object distance of 1, 2 or 4 m, respectively, in the example scenario of FIG. 24.
Figure 26C:
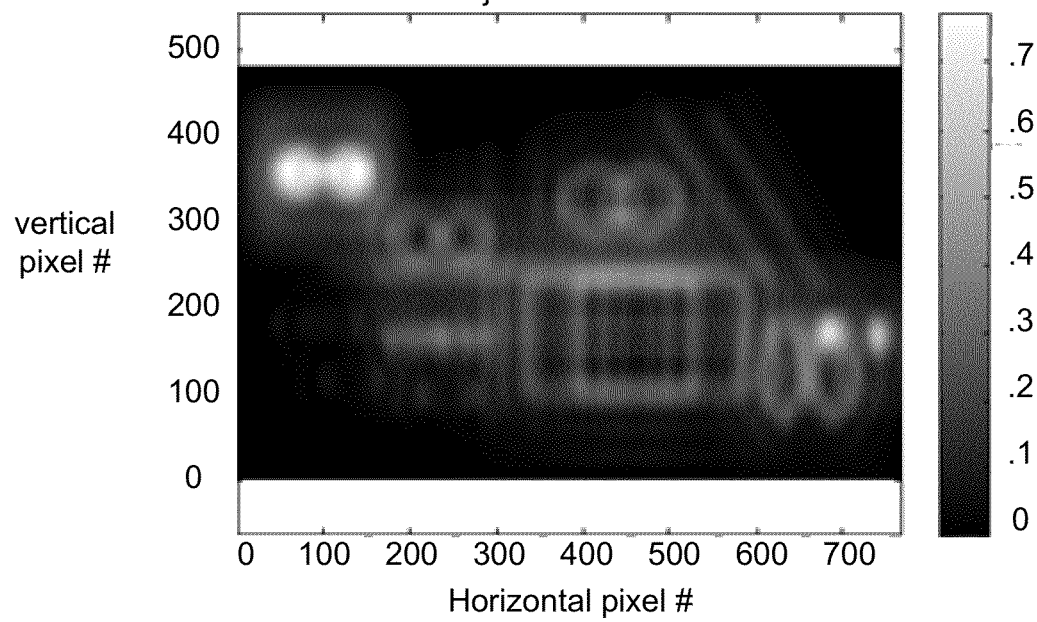
Figure 26D:
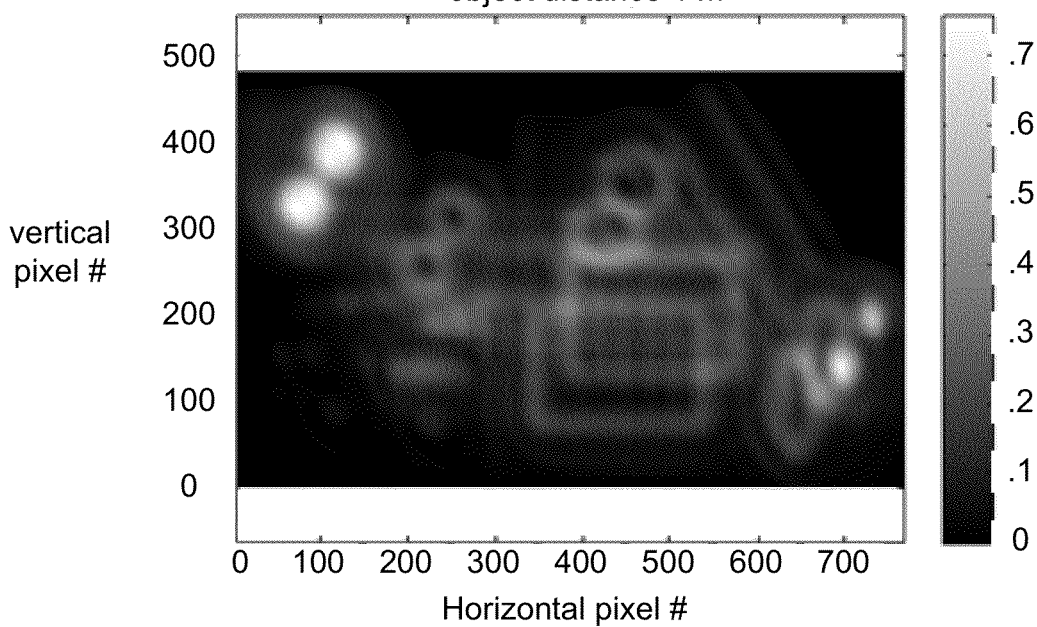

In particular, FIG. 26A depicts an original, reference image in the example scenario of FIG. 24. This is an image that is obtained geometrically in a perfect standard imaging system. The image depicts a variety of test shapes. FIGS. 26B, 26C and 26D shows resultant coded images with the double-helix transfer function at different object distances. In particular, FIGS. 26B, 26C and 26D depict a diffracted image at an object distance of 1, 2 or 4 m, respectively, in the example scenario of FIG. 24. The units along the x-axis and y-axis are pixels. It can be seen that the coded image has redundant image features which are offset from one another according to a rotation angle. The reference image has the same image features but they do not appear redundantly. Depth information of the imaged objects can be determined based on the rotation angle of the features. For example, a feature 2600 is depicted in the reference image of FIG. 26A. This same feature will appear as the redundant features 2602 and 2604 in the coded image of FIG. 26B. An angle of rotation can be defined by an angle between a horizontal line and a line between corresponding portions of the redundant features. Here, the rotation angle is close to 90 degrees. A light intensity scale is provided on the right hand side of each figure.

Regarding depth extraction based on the double-helix PSF, one way to extract depth information is to recover the PSF by use of two frames and a deconvolution algorithm. For further details, see A. Greengard, Y. Y. Schechner and R. Piestun, "Depth from diffracted rotation," Optical Letters, vol. 31, no. 2, pp. 181-183, Jan. 15, 2006, incorporated herein by reference. In addition to the image by double-helix PSF system, a reference frame that is least sensitive to defocus while being relatively sharp throughout the depth range of interest is needed. The double-helix PSF can be estimated from $$\hat{h}_{dh}(\Psi) = F^{-1}\{H_{dh}(\Psi)\} = F^{-1}\left(\frac{I_{dh}}{I_{ref}}H_{ref}\right)$$

where F denotes the Fourier transform, $\Psi$ is the defocus parameter, $H_{dh}$ and $H_{ref}$ are the optical transfer functions of the double-helix PSF and the reference PSF, respectively. The reference PSF is the PSF from the image sensor without the phase mask. $I_{dh}$ is the Fourier transform of the image intensity values $i_{ref}$ of the pixels obtained by the double-helix system (e.g., FIG. 26B, 26C or 26D), and $I_{ref}$ is the Fourier transform of the image intensity values $i_{dh}$ of the pixels of the reference image (e.g., FIG. 26A). Once the PSF is recovered, the depth can be estimated by the angle of rotation through calibration.

Another approach is to directly estimate the angle of rotation formed by structured light spots generated by a projector/illuminator. If the light spots are small enough and well separated, then each spot generates a distinguishable double helix on the image, from which the rotation angle can be estimated and therefore defocus (depth). However, the light spot image size (by a perfect lens and diffraction-free) should be smaller that the double-helix PSF spot distance, in order for the resultant double-helix pattern to be suitable for angle estimation. This spot size limit, which is the distance between the two double helix spots, and may be less than <9 μm, is very close to the diffraction-limited spot size of a point light source. This approach may be viable if the imaging system is properly optimized, including double-helix PSF, lens, structured light, and imaging sensor.

Figure 27:
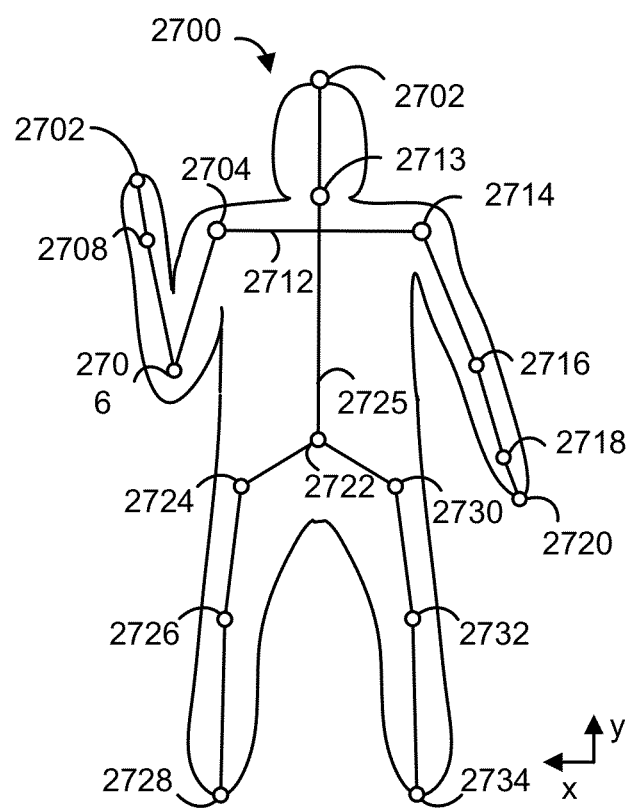
FIG. 27 depicts an example model of a user as set forth in step 608 of FIG. 6.

FIG. 27 depicts an example model of a user as set forth in step 608 of FIG. 6. The model 2700 is facing the depth camera, in the −z direction, so that the cross-section shown is in the x-y plane. Note the vertical y-axis and the lateral x-axis. A similar notation is provided in other figures. The model includes a number of reference points, such as the top of the head 2702, bottom of the head or chin 2713, right shoulder 2704, right elbow 2706, right wrist 2708 and right hand 2710, represented by a fingertip area, for instance. The right and left side is defined from the user's perspective, facing the camera. The model also includes a left shoulder 2714, left elbow 2716, left wrist 2718 and left hand 2720. A waist region 2722 is also depicted, along with a right hip 2724, right knew 2726, right foot 2728, left hip 2730, left knee 2732 and left foot 2734. A shoulder line 2712 is a line, typically horizontal, between the shoulders 2704 and 2714. An upper torso centerline 2725, which extends between the points 2722 and 2713, for example, is also depicted.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A 3-D depth camera system, comprising:
   (a) an illuminator, the illuminator comprising:
      (i) at least one collimated light source which provides a collimated light beam;
      (ii) a diffractive optical element which receives the collimated light beam, and creates a plurality of diffracted light beams which illuminate a field of view including a human target;
   (b) an image sensor which provides a detected image of the human target using reflections of the diffracted light beams from different portions of the human target, the image sensor includes a phase mask which adjusts the detected image so that a point spread function of each of the reflections of the diffracted light beams from the human target is imaged as a double helix; and
   (c) at least one processor associated with the image sensor which determines depth information of the different portions of the human target, and in response to the depth information, distinguishes motion of the human target in the field of view.

2. The 3-D depth camera system of claim 1, wherein:
the at least one processor tracks movement of the human target over time based on the depth information, and provides a corresponding control input to an application, and the application updates a display based on the control input.

3. The 3-D depth camera system of claim 1, wherein:
the diffractive optical element creates the plurality of diffracted light beams as a plurality of diffractive orders; and
the at least one processor determines the depth information of the different portions of the human target based on a rotation of the double helix of each diffractive order of the detected image.

4. The 3-D depth camera system of claim 3, wherein:
the at least one processor determines the depth information of the different portions of the human target based on a rotation of two distinct spots of light which are offset from one another according to a rotation angle.

5. The 3-D depth camera system of claim 4, wherein:
the rotation angle varies by 180 degrees over a depth range of at least one meter.

6. The 3-D depth camera system of claim 1, wherein:
the at least one processor determines the depth information based on at least an intensity distribution of the detected image.

7. A 3-D depth camera system for imaging an object in a field of view, comprising:
a first sensor which provides a reference image of the object without using a phase mask, the reference image comprises an image feature which does not appear redundantly in the reference image;
a second sensor which provides a coded image of the object using a phase mask, the coded image comprises redundant appearances of the image feature which are offset from one another according to a rotation angle, and the phase mask encodes light from the object according to a double helix point spread function; and
at least one processor which determines depth information of the object based on at least a light intensity distribution of the reference image ($i_{ref}$) and a light intensity distribution of the coded image ($i_d$).

8. The 3-D depth camera system of claim 7, wherein:
the reference image and the coded image are obtained at a same point in time.

9. The 3-D depth camera system of claim 7, wherein:
the at least one processor tracks movement of the object based on the depth information, and provides a corresponding control input to an application, and the application updates a display based on the control input.

10. The 3-D depth camera system of claim 9, wherein:
the object is a human target.

11. The 3-D depth camera system of claim 7, wherein:
the at least one processor, in response to the depth information, distinguishes motion of the object in the field of view.

12. The 3-D depth camera system of claim 7, wherein:
the reference image is uncoded.

13. The 3-D depth camera system of claim 7, wherein:
the at least one processor determines the depth information using an optical transfer function ($H_{ref}$) of a point spread function of the reference image.

14. The 3-D depth camera system of claim 13, wherein:
the at least one processor determines the depth information according to: $F^{-1}\{F(i_{dh}) \times H_{ref}/F(i_{ref})\}$, where F denotes a Fourier transform and $F^{-1}$ denotes an inverse Fourier transform.

15. A 3-D depth camera system for imaging an object in a field of view, comprising:
- a first sensor which provides a reference image of the object, the reference image comprises an image feature which does not appear redundantly in the reference image;
- a second sensor which provides a coded image of the object using a phase mask, the phase mask encodes light from the object according to a double helix point spread function, the coded image comprises redundant appearances of the image feature which are offset from one another according to a rotation angle; and
- at least one processor which determines the rotation angle based on the reference image and the coded image and determines depth information of the object based on the rotation angle.

16. The 3-D depth camera system of claim 15, wherein:
the first sensor detects light at a near-infrared wavelength to provide the reference image; and
the second sensor detects light at a near-infrared wavelength to provide the coded image.

17. The 3-D depth camera system of claim 15, wherein:
the 3-D depth camera system does not use an illuminator.

18. The 3-D depth camera system of claim 15, wherein:
the 3-D depth camera system does not illuminate the object with coded light.

19. The 3-D depth camera system of claim 15, wherein:
a depth range over which the redundant appearances of the image feature rotate 180 degrees is at least one meter.

20. The 3-D depth camera system of claim 1, wherein:
the reflections of the diffracted light beams from the different portions of the human target comprise a continuum of rays which are reflected from the different portions of the human target.

* * * * *